US012622831B2

(12) United States Patent
Skomra

(10) Patent No.: US 12,622,831 B2
(45) Date of Patent: May 12, 2026

(54) APPARATUS FOR ASSISTING SUBJECTS FROM SUPINE TO SITTING POSITION

(71) Applicant: Elise D. Skomra, Round Rock, TX (US)

(72) Inventor: Elise D. Skomra, Round Rock, TX (US)

(73) Assignee: Bed Brace, LLC, Round Rock, TX (US)

( * ) Notice: Subject to any disclaimer, the term of this patent is extended or adjusted under 35 U.S.C. 154(b) by 383 days.

(21) Appl. No.: 18/130,378

(22) Filed: Apr. 3, 2023

(65) Prior Publication Data

US 2023/0310238 A1 Oct. 5, 2023

Related U.S. Application Data

(60) Provisional application No. 63/327,217, filed on Apr. 4, 2022.

(51) Int. Cl.
*A61G 7/05* (2006.01)

(52) U.S. Cl.
CPC .................................... *A61G 7/05* (2013.01)

(58) Field of Classification Search
CPC ...... A61G 7/00; A61G 7/05; A61G 2200/327; A61G 2200/34; A61G 7/10; A61G 7/1038
See application file for complete search history.

(56) References Cited

U.S. PATENT DOCUMENTS

| | | | | |
|---|---|---|---|---|
| 3,237,215 A * | 3/1966 | Fried | A61G 7/02 | 5/632 |
| 3,286,283 A * | 11/1966 | Bertoldo | A61G 7/053 | 5/662 |
| 3,739,793 A * | 6/1973 | Wilson | A61G 7/1038 | 5/503.1 |
| 4,941,495 A * | 7/1990 | Boyce | A61G 7/053 | 135/65 |

(Continued)

FOREIGN PATENT DOCUMENTS

| | | |
|---|---|---|
| CN | 201978068 U | 9/2011 |
| KR | 10-2054767 B1 | 1/2020 |

OTHER PUBLICATIONS

Anong Tantisuwat et al, "Multi-directional Reach Test: An Investigation of the Limits of Stability of People Aged between 20-79 Years," J Phys Ther Sci. Jun. 2014; 26(6): 877-880 Published online Jun. 30, 2014. doi: 10.1589/jpts.26.877.

*Primary Examiner* — Fredrick C Conley
(74) *Attorney, Agent, or Firm* — Nixon & Vanderhye P.C.

(57) ABSTRACT

A frame structure has an adjustable height and width and comprises a pair of parallel triangular trusses each having a hypotenuse handrail member defining a series of successive ascending cylindrical handhold surfaces. The structure is dimensioned to sit on the top surface of a standard mattress and is anchored by a strap component that connects and wraps either around the headboard or under the bed (i.e mattress). Its two side handrails sit on either side of the user and connect to the top, bottom and back of the frame. The (Continued)

upwardly extending side rails provide a succession of cylindrical handholds of increasing elevation to enable the subject to pull themselves up from a supine position to a sitting position with little to no use of their abdominal muscles. The handrails are collapsible allowing the user greater range of motion and mobility once upright and seated.

22 Claims, 27 Drawing Sheets

(56) References Cited

U.S. PATENT DOCUMENTS

| | | | | |
|---|---|---|---|---|
| 5,347,666 | A * | 9/1994 | Kippes | A61G 7/1038 5/81.1 R |
| 6,425,154 | B1 * | 7/2002 | O'Connell | A61G 7/053 482/904 |
| 11,191,689 | B1 * | 12/2021 | Terebus | A61G 7/1038 |
| 2013/0048041 | A1 * | 2/2013 | Thomas | A61G 7/1038 135/65 |
| 2021/0100707 | A1 * | 4/2021 | Wolpe | A63B 21/4043 |

* cited by examiner

APPARATUS FOR ASSISTING SUBJECTS FROM SUPINE TO SITTING POSITION

CROSS-REFERENCE TO RELATED APPLICATIONS

Priority is claimed from U.S. provisional patent application No. 63/327,217 filed Apr. 4, 2022, incorporated herein by reference.

FIELD

This technology relates to apparatus for assisting a human subject to a sitting position, and more particular to an apparatus attachable to a bed that assists a human subject into a sitting position from a supine position.

BACKGROUND & SUMMARY

Being a new mother can be a challenge. Imagine giving birth via an emergency (unexpected) C-section—which is major abdominal surgery. You would likely be vastly under prepared for what the recovery process would mean for you. Without the help of family, you would not know how to manage your own recovery let alone being a first-time mom with a newborn. You would be held up in bed for weeks with little motivation to sit up or move to avoid the pain.

One of the worst parts about this experience might be the knowledge that there is a solution that could help you manage the pain—a rentable hospital bed—but that the solution might not be feasible for you due to expense, space or other factors. While in the hospital those first few days, a nurse might teach you how to sit up and adjust yourself in bed, virtually pain free, using the hospital bed railings. But recreating that environment at home may require extensive arrangements and hundreds of dollars per week or month for a hospital bed rental. This may not be feasible from a price point for many, let alone being able to provide the additional space for another bed in your living space.

There are many products on the market that purport to retrofit a standard bed with hospital bed like side rails. Many such products are designed to prevent a patient from falling out of bed. Some such products are designed to help a patient get out of bed. Some such products are foldable/collapsible so they can be retracted out of the way when the patient wishes to get out of bed.

Products that advertise bed sitting assistance include single-hand side bed rails, bed rope ladders, ceiling mounted bed trapeze bars, and bed trapeze bars mounted on a floor-supported stand. A problem with such products is they generally are positioned in front of the subject. They have the subject sitting up in a forward motion and in the same spot in which they were laying down. Any such forward crunch-like movement would engage your core and put pressure on your abdominal region. Additionally, sitting up in a forward motion leaves your hips in the same spot as where they were when you were laying down. Your hips are still too far away from the head of the bed, and you then must do additional repositioning to move or scoot backwards if you wish to remain sitting in bed and use the headboard of the bed as support. Once in a seated position, there is already abdominal pressure so any additional sliding lateral movement may cause pain—especially if the subject had limited core function such as would result from abdominal surgery.

Additionally, the retrofit railing systems currently available are generally only on one side of the bed. The asymmetrical nature of these products would cause the subject to have to twist and use one side of their core, potentially requiring additional adjustments. While it would be possible to purchase two sets of rails for opposite sides of the bed, many beds such as full, queen and king sized beds are too wide to allow the subject to use opposite rail sets to raise themselves up to a sitting position.

What is needed is something more mobile, more pain free and more convenient that does not require a special expensive hospital bed rental but could be adapted or retrofitted to an ordinary bed, while overcoming the disadvantages of prior approaches discussed above. Such a solution should be of help for (but not being limited to) abdominal surgery recovery to provide a more pain free experience for those who need that additional support.

BRIEF DESCRIPTION OF THE DRAWINGS

FIG. 2A-1 shows an example anchoring strap.

DETAILED DESCRIPTION OF NON-LIMITING EMBODIMENTS

Figure 1A:
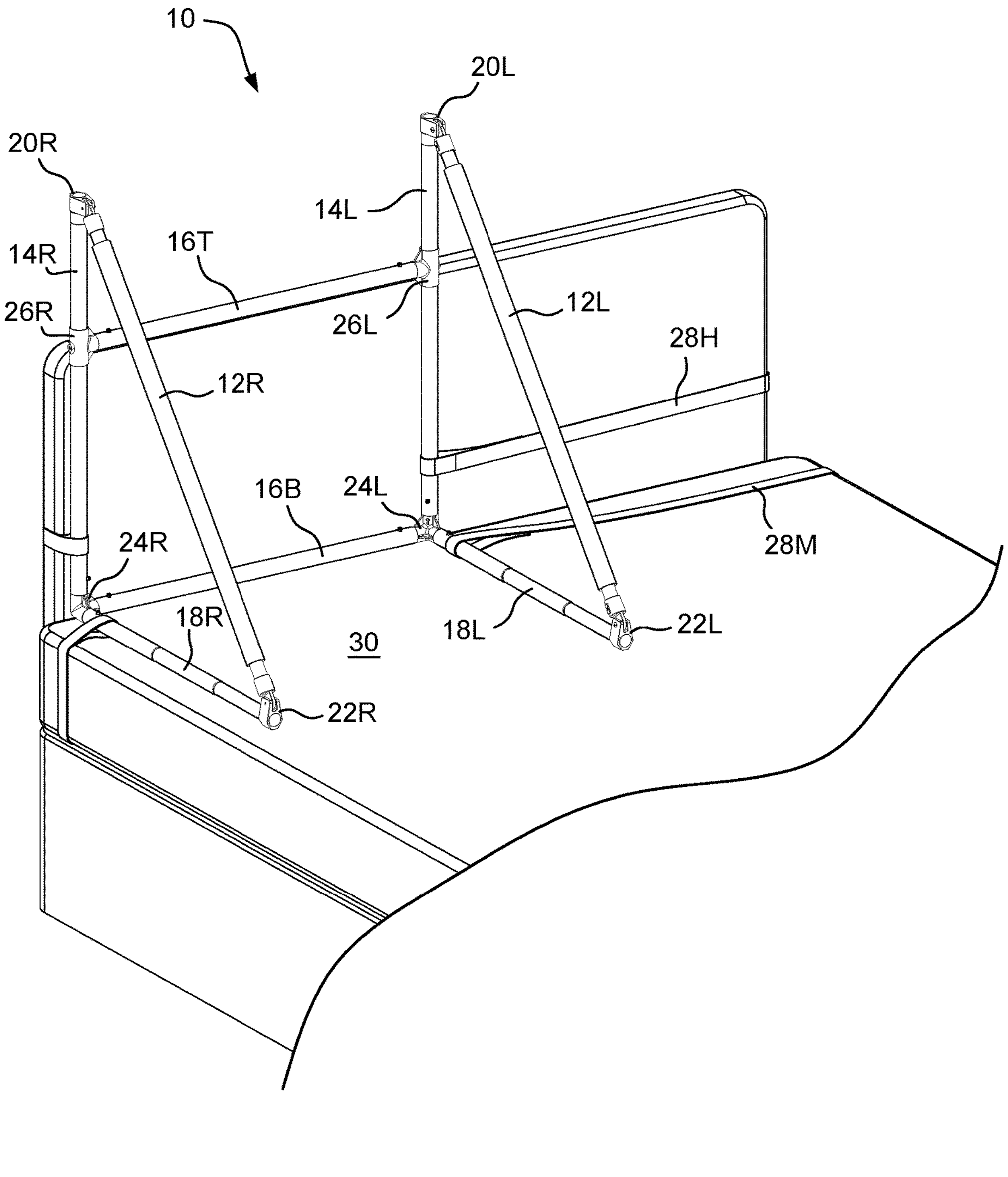
FIG. 1A shows a front elevated perspective view of an example embodiment of a support frame mounted to a conventional bed.

An example embodiment of an apparatus which I call "C-Sit" comprises a frame structure that assists and supports mobility, specifically moving from a supine position to an upright seated position.

A non-limiting apparatus comprises an anchoring bed attachment comprising a railing structure and system that can be used with any standard bed and/or bed mattress. The entire apparatus is portable, removable, and customizable (e.g., to change its size). It can be sold independently of the bed and mattress. The apparatus enables the subject to sit up using upper and lower body strength while limiting the pressure on their abdominal muscles. This product is intended for use in situations where the subject has limited core functionality (e.g., after abdominal (bariatric) surgery, after c-section, abdominal injury recovery, long term pregnancy bed rest, elderly, limited core strength, etc.).

Example non-limiting embodiments comprise a bed attachment suitable for retrofitting, that is used for sitting assistance. Embodiments may provide a portable, removable, customizable (e.g., in size), railing system having the same overall functional capabilities as a hospitable bed railing system, that can be used on any standard bed mattress. In addition, there may be attachment options such as a caddy-like bag to hold an electronic television remote, a water bottle, baby items, etc. or a table on an articulating arm to mimic hospital-like accommodations.

One embodiment provides a support frame comprising: a first right triangular truss, a second right triangular truss, and at least one linkage between the first right triangular trust and the second right triangular truss to maintain the first and second right triangular trusses parallel to each other, wherein a hypotenuse member of the first right triangular truss and a hypotenuse member of the second right triangular truss each are structured and dimensioned to provide handrails and the trusses are dimensioned to enable a subject within the support frame to use the handrails to raise themselves from a supine position to a sitting position.

When a subject occupies the space between the two triangular trusses, no part of the frame structure is suspended directly above the subject and the hypotenuse members provide a series of successive cylindrical ascending handhold surfaces.

Another embodiment provides a subject-assisting apparatus which enables mobility from a supine to upright position comprising: a support structure, plural upwardly extending grasping members suspended by the support structure frame; and an anchoring system.

The support structure comprises a frame including two vertical telescoping members connected perpendicularly at their respective bases to two horizontal telescoping members creating an L-shaped substructure, wherein within the L-shaped substructure, all telescoping members expand away from the connection site, and the two L-shaped substructures are parallelly positioned and connected to each other by two more horizontal members whereby the lower horizontal member joins at the respective connection sites of the two L-Shaped substructures and the upper horizontal member joins to the parallel vertical telescoping members.

Connection sites of the L-Shaped substructures and the lower horizontal connecting member are held together by three-way elbow coupling mechanisms or corner fittings. Such three-way fittings having appendages on the x, y and z planes wherein the angles are all at 90 degrees. Such corner fittings accepting three segments of members: vertical telescoping members, horizontal telescoping members and horizontal connecting members.

Connection sites of the upper horizontal connecting member and the vertical telescoping members are held together with Tee couplings consisting of two sockets inline and one perpendicular appendage so that the angles are 90 degrees, the socket aspect of the Tee coupling fitting around or semi around the vertical telescoping members while the perpendicular appendage connects to the second horizontal connecting member.

An upper horizontal connecting member is adjustable in that it can be moved by sliding the Tee couplings lower or higher along the vertical telescoping members, thus creating an infinite range of rectangular sized subframes on the back plane of the structure.

The elbow couplings consist of tube locking spring button clips that lock into the structure to keep them connected.

The tee coupling appendages consist of tube locking spring button clips that lock into the structure to keep them connected.

The support structure is configured and dimensioned to be employed on a horizontal surface.

The support structure comprises rigid tubular structures that are circular in cross-section and that are 0.5 inch to 1.5 inch in diameter to support the weight of a person.

The support structure is made from a material sturdy enough to support the weight of a person as she is lifting herself up using the apparatus such as stainless steel or aluminum alloy.

The exterior of the support structure material has a smooth, matte, anodized, finish to increase corrosion and wear resistance.

Plural grasping members are connected at non-perpendicular angles to the plural horizontal telescoping support members and the plural vertical telescoping support members of the support structure in a triangular composition so that the plural gripping members being configured and dimensioned to extend upwardly away from the horizontal surface.

Plural upwardly extending grasping members are dimensioned and oriented to provide a succession of increasingly elevated handhold positions for the subject.

The grasping members are hinged to the top of the telescoping vertical support members as well as hinged to the ends of the plural telescoping horizontal support members. As such, the grasping members are collapsible and expandible relative to the expansion position of the plural telescoping horizontal and vertical support members thereby altering the angle at which the grasping members protrude away from any surface.

The grasping members comprise rigid tubular structures that are circular in cross-section and that are 0.5 inch to 1.5 inch in diameter in order to be grasped by a range of human hand sizes.

The grasping members are made from a material sturdy enough to support the weight of a person as she is lifting herself up using the apparatus such as stainless steel or aluminum alloy.

The grasping members exterior have a smooth, matte, anodized, finish to increase corrosion and wear resistance.

The grasping members are incased with additional foam or rubber material which provides superior subject grip and ergonomic comfort.

At least one anchoring member structured, dimensioned and oriented to simultaneously be connected to the support structure and disposed beneath a mattress, beneath a bed frame or behind the headboard in order to stabilize the apparatus.

The anchor member is composed of two, 1-inch-wide straps made from polyester tie down webbing. One end of each strap is looped so that it can easily slide onto and connect to each side of the support structure; the other ends of the two straps are then positioned under or behind the bed and connected to each other via a Cam Buckle, wherein the strap connected in total is 20' in length to fit around any size bed, the strap has a breaking strength of 3,000 pounds, the Cam Buckle has a breaking strength of 1,500 pounds, and assembled, the anchoring member has a 500-pound working load limit to support the weight of an average human.

The anchoring member is adjustable in size or length using straps and buckle apparatus to tighten and stabilize the apparatus.

The apparatus symmetrically dimensioned and configured in relation to the subject to provide equally distributed support for the weight and movement of the subject.

The apparatus is portable, dismantlable, and removable irrespective of surface as to be easily sanitized.

The plural grasping members have at least portions dimensioned and configured so an upwardly-facing human subject supine on the sleeping surface can grip the plural grasping members by at least partially encircling the grasping members with their at least partially closed hands, the plural grasping members being further configured and dimensioned to support the weight of the human subject as the human subject grips the grasping members to progressively suspend and pull their upper body up and away from the horizontal surface and themself into an upright seated position between the support frame and between the plural gripping members.

Detailed Example Embodiments

Figure 1B:
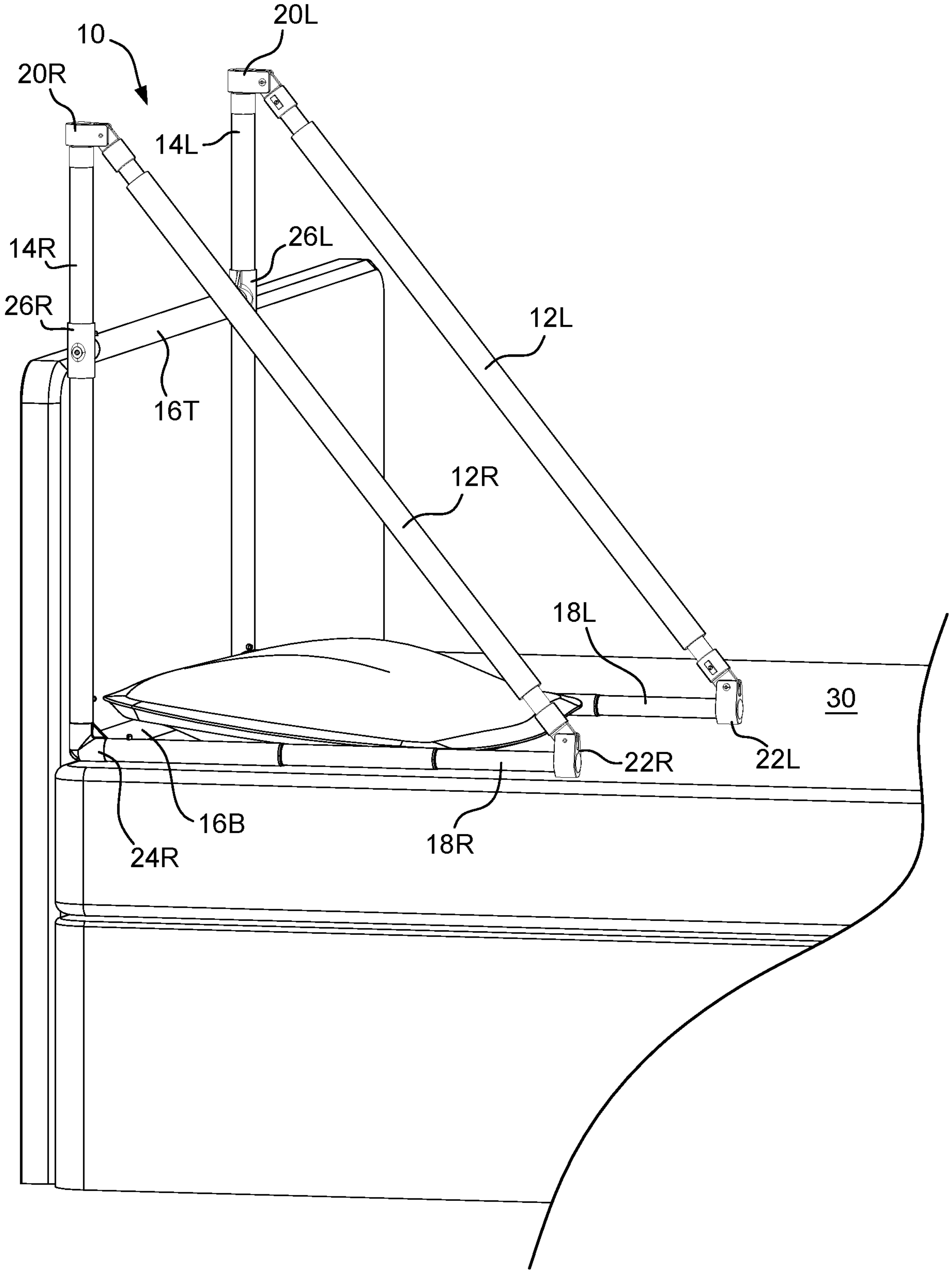
FIG. 1B shows a side elevated perspective view of an example embodiment of a support frame disposed on a conventional bed.

FIGS. 1A-1B shows a conventional bed including a mattress, box springs and a frame. The bed frame may have a headboard on one end. The frame suspends the mattress and box springs above the floor. A top horizontal surface of the mattress may define a compressible sleeping surface a subject can lay on in a supine position to sleep. The mattress may be covered by a conventional mattress pad, a conventional fitted sheet, a sheet, a blanket, etc. to define a sleeping surface thereon. A conventional pillow may be disposed on the sleeping surface of the bed. The bed may be of any conventional size such as twin, double, queen or king.

Figure 1C:
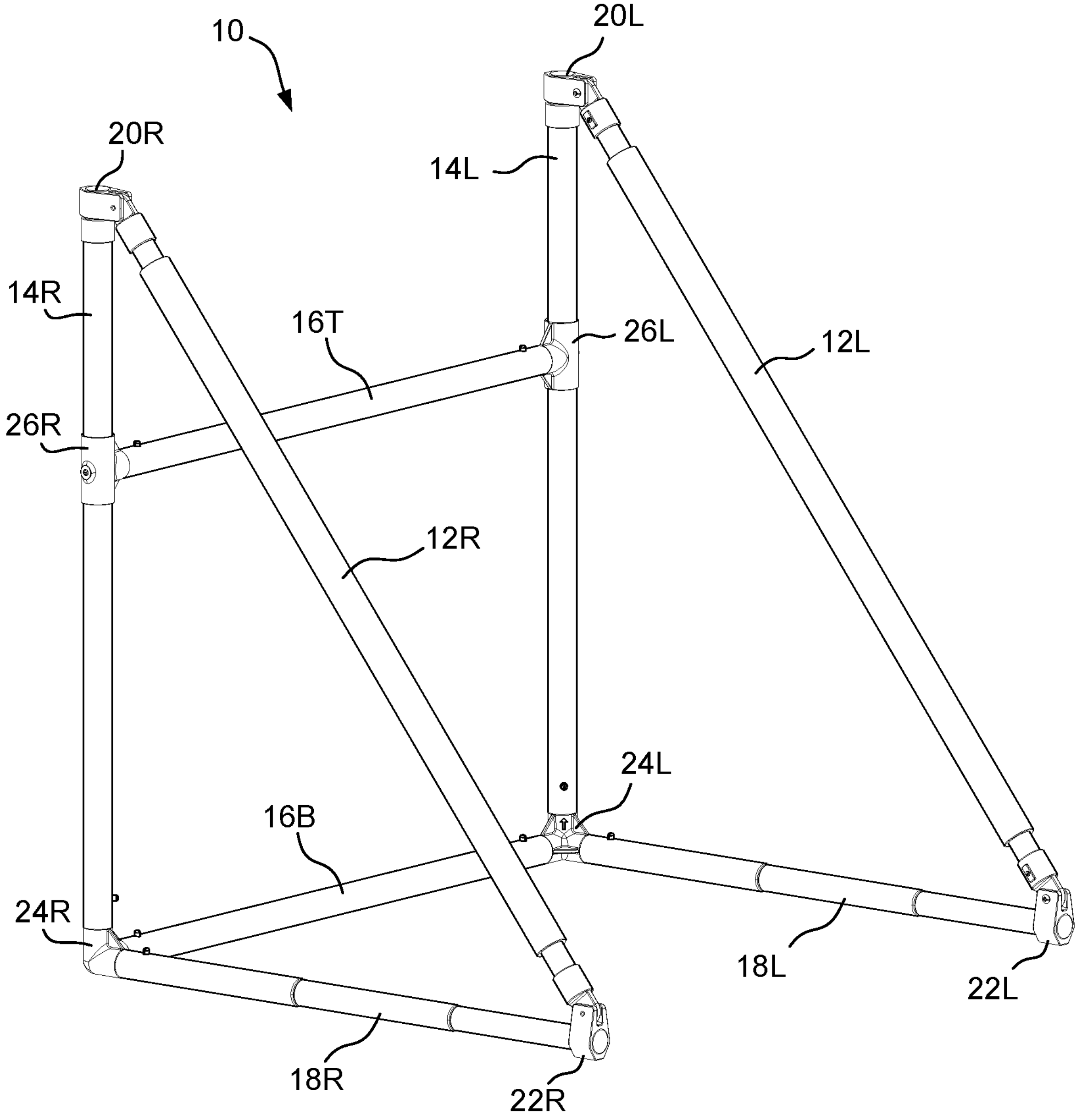
FIG. 1C show a side elevated different perspective view of an example embodiment assembled but not yet mounted to a bed.

FIGS. 1A-1C shows one example embodiment of a support structure 10 disposed on the sleeping surface of the bed. The support structure 10 comprises a frame inclusive of handrails 12L, 12R, that in one embodiment has an adjustable height and width. The support structure 10 sits on top of the sleeping surface defined by the standard mattress or other flat surface, and is anchored by a strap component 28 that connects and wraps around the headboard and/or under the bed, e.g., between the mattress and box springs of a standard bed. The support structure 10 may but need not span the entire width of the bed—for example, in the example shown, the bed may be a queen sized bed wide enough to sleep two people, and the support structure 10 spans only a portion of that width (e.g., a width sufficient to sleep one person).

The two side handrails 12L, 12R sit on either side of the subject and connect to the side frame members 14L, 14R with pivot components 20L and 20R and the bottom frame members 18L, 18R with pivot components 22L and 22R. The side frame members are held together and connected to the back frame members 16T and 16B by connector components 241, 24R, 26L and 26R. The frame 10 sits behind, above, and to each side of the subject.

In more detail, the frame 10 comprises left and right handrails 12L, 12R that in use are neither vertically oriented nor horizontally oriented, but rather have an orientation that in use is between vertical and horizontal. An upper distal end of each handrail 12L, 12R is pivotably mounted to ends of respective upwardly projecting rear frame members 14L, 14R via pivotable mounting elements 20L, 20R, respectively. These pivotable mounting elements 20 permit the respective handrails 12L, 12R to pivot between a vertical orientation that is parallel or nearly parallel to a respective rear frame element 14, and various orientations other than vertical. In one embodiment, the handrails 12L, 12R are each adjustable in length (for example, they could each comprise a telescoping member) so that they can independently be repositioned to any desired orientation between approximately vertical and some maximum angle away from vertical.

Figure 3A:
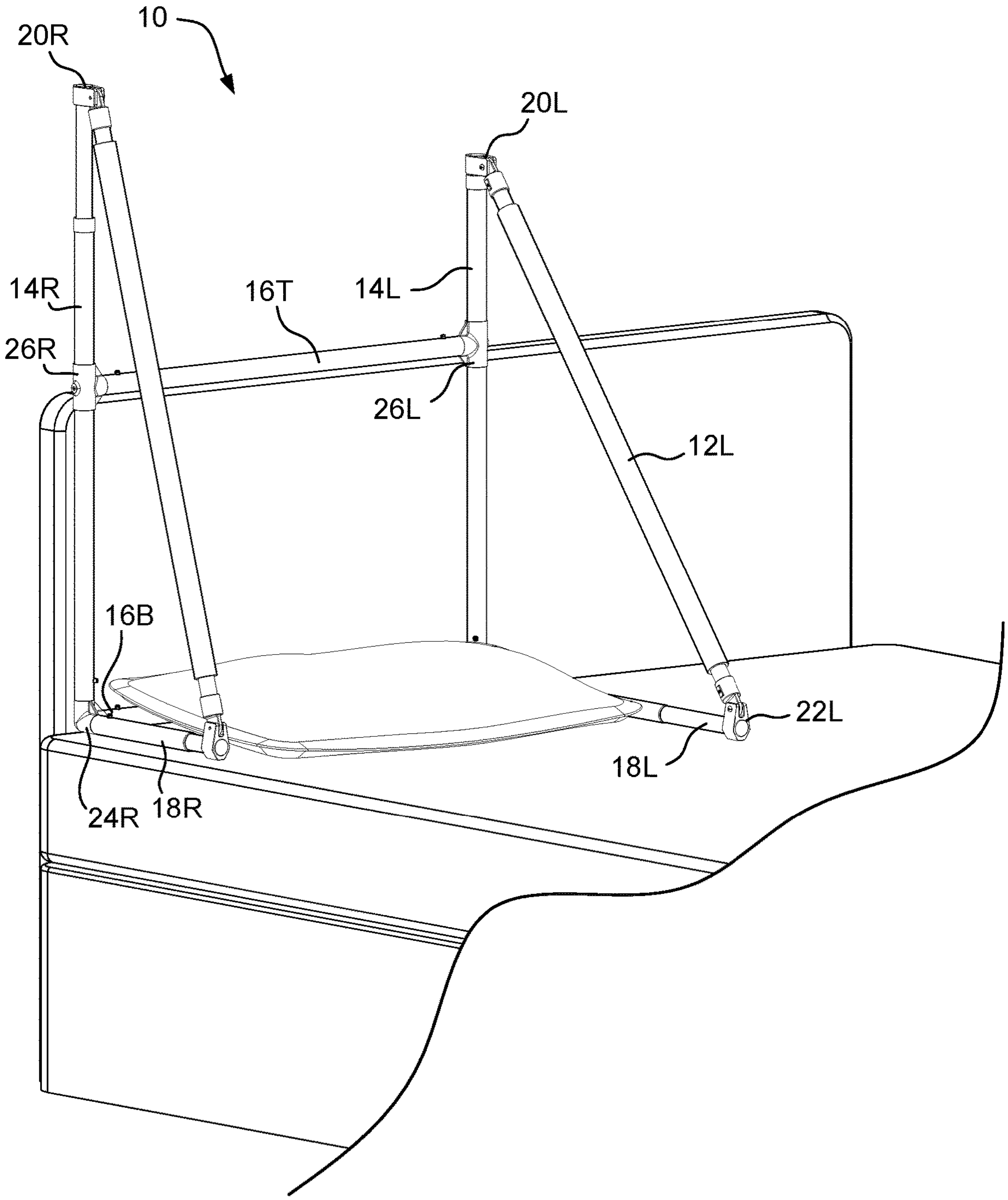
FIGS. 3A-3C show different views of embodiments with a right-side (relative to the subject) railing retracted.
Figure 3B:
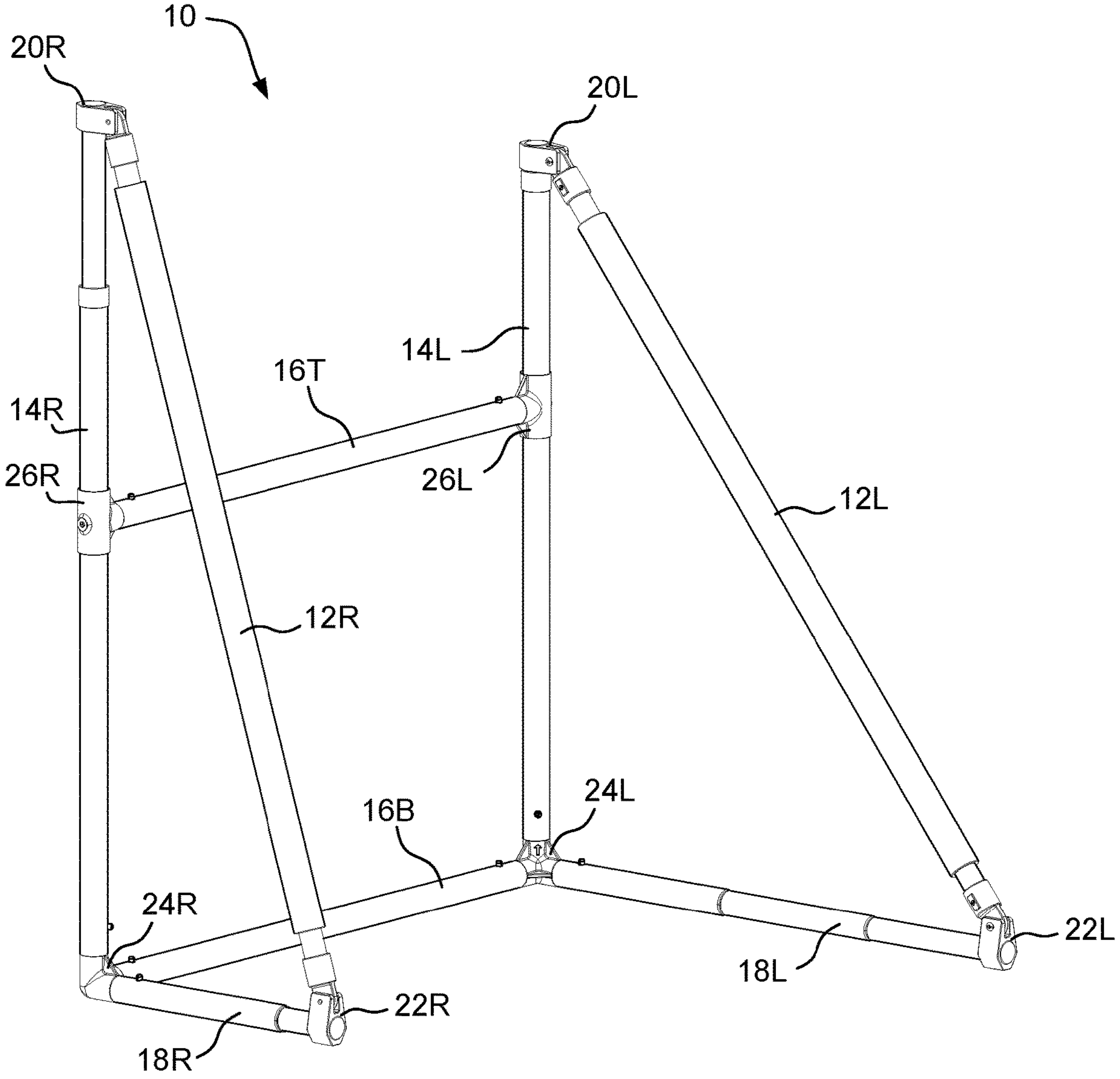
Figure 3C:
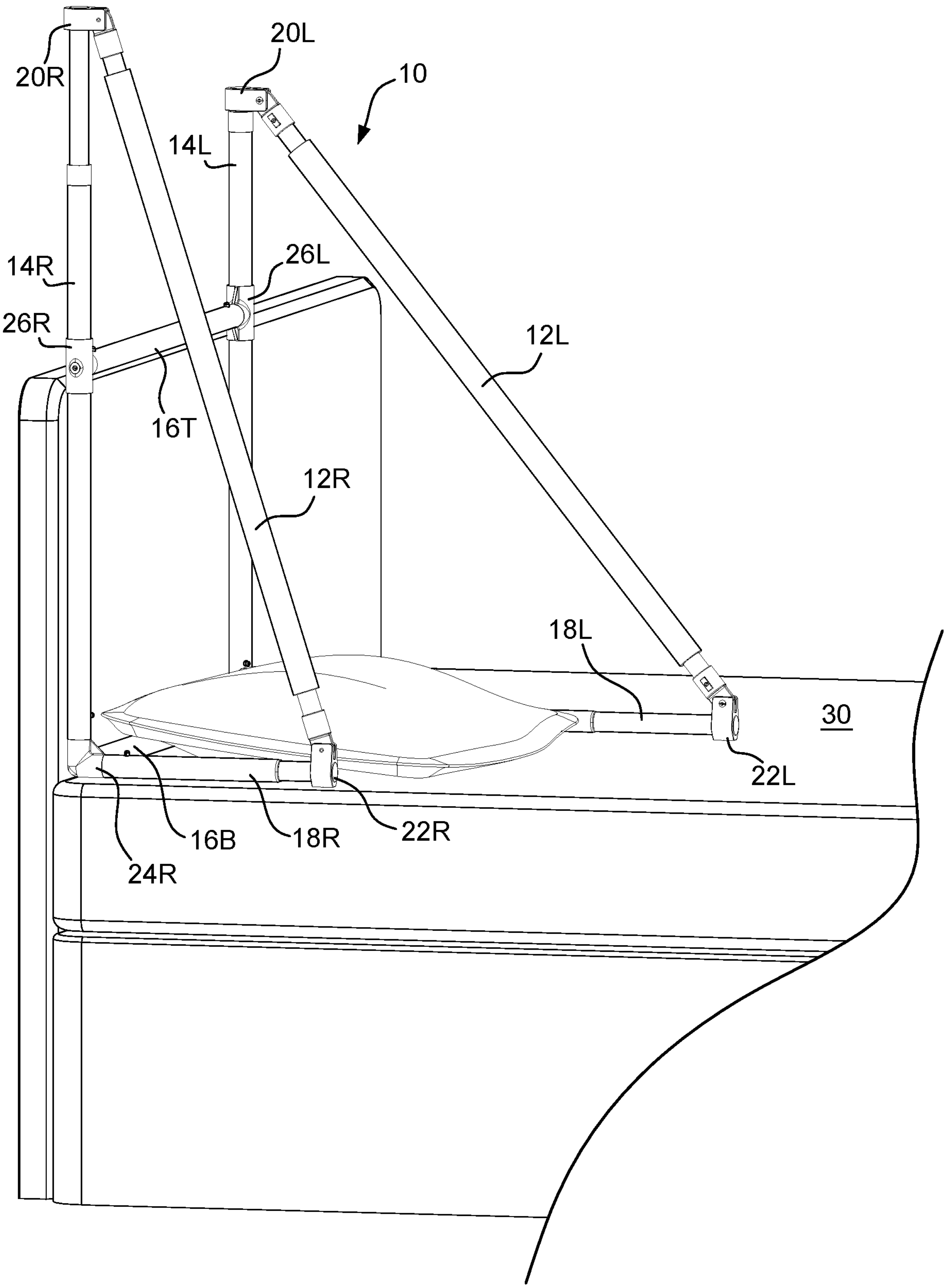

A lower distal end of each handrail 12L, 12R is connected to pivotable mounting elements 22L, 22R, respectively. In one embodiment, the pivotable mounting elements 22L, 22R mount the lower distal ends of each handrail 12L, 12R to a respective horizontal support member 18L, 18R. These horizontal support members 18L, 18R, in one embodiment, each have an adjustable length (e.g., telescoping member) so they are extensible outwardly away from the vertical members 14L, 14R by desired distances. This arrangement enables the handrails 12L, 12R to be slidably adjusted in position between extended outward positions and orientations as FIGS. 1A-1C shows and retracted positions as shown in FIGS. 3A-3C. In one embodiment, handrails 12L, 12R may have similar structures so they are each variably oriented. In another embodiment, only one of the handrails is variably oriented and the other handrail is fixed in length or is designed to be set to a particular extension length and then left in that position during normal use.

As noted above, in the example shown, the lower side rails 18L, 18R each comprise a telescoping pole to enable the respective handrails 12R and 12L to be able to contract and expand. In some embodiments, these lower side rails are removable as opposed to being retractable so as not to obstruct or confine sleeping patients. In other embodiments, the lower side rails 18L, 18R and upwardly extending hand rails 12L, 12R can serve as retaining rails when extended and in place, to keep a subject from falling out of bed.

Figure 4A:
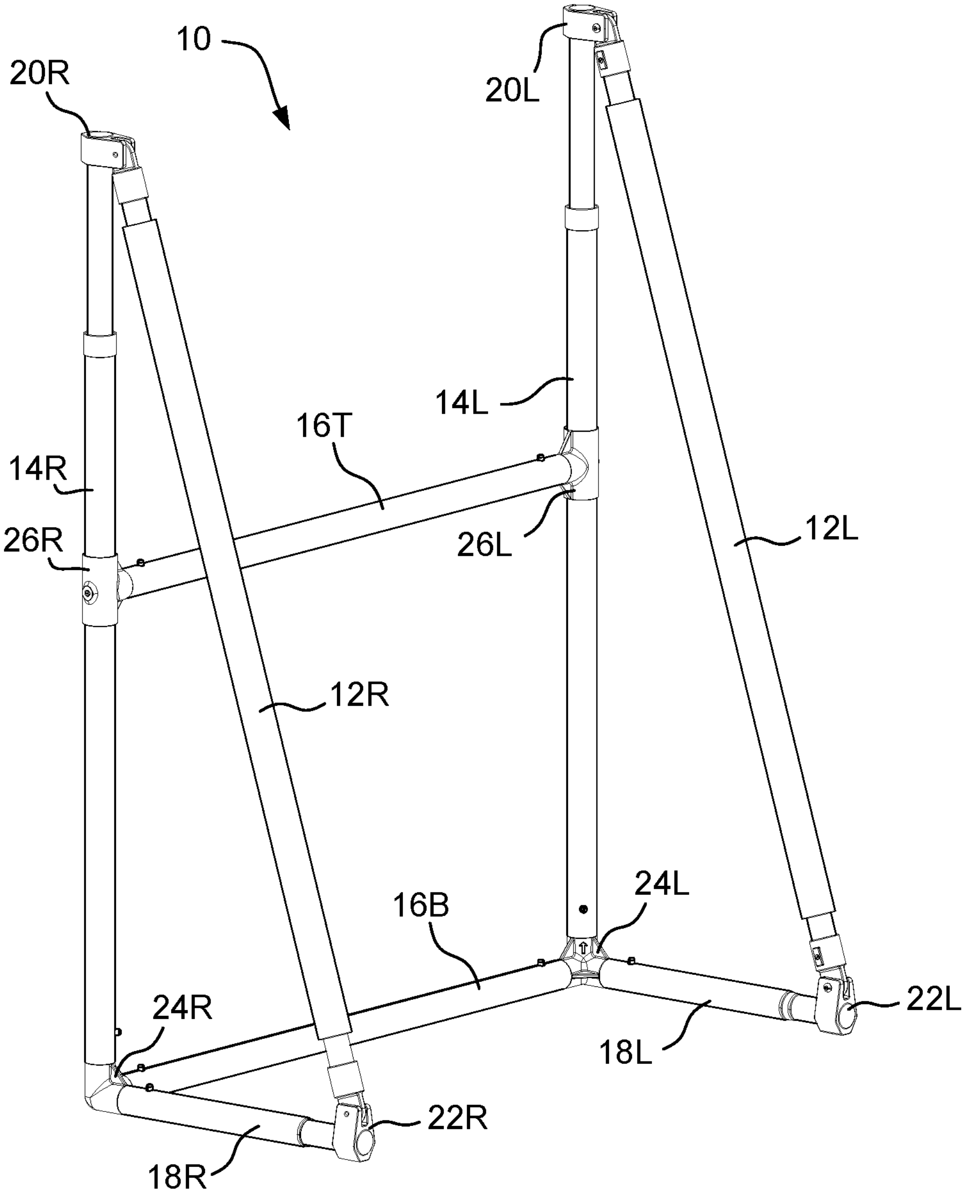
FIGS. 4A-4B show show different views of embodiments with left and right-side railings retracted together.
Figure 4B:
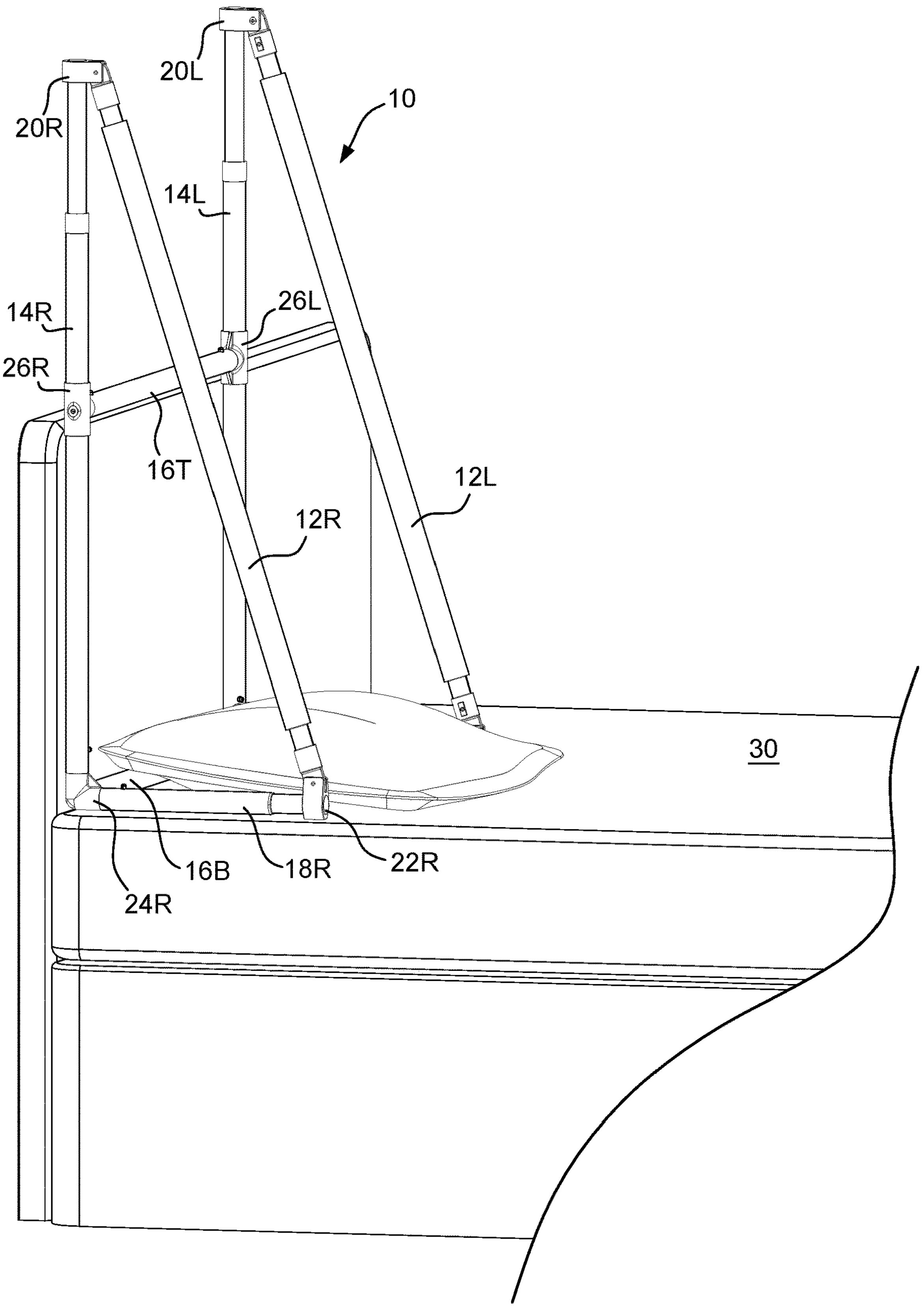

In one embodiment, handrails 12L, 12R each have a changeable length so that the handrails increase in length as they are slid from the FIG. 4A retracted position to the FIG. 1A extended position (see also FIG. 3A showing one handrail more extended than another). Such adjustable length can be provided in various structural ways including using an arrangement of telescoping coaxial tubes of different diameters (one inside the other). In the example shown, handrails 12L, 12R can be slidably adjusted independently of one another so one handrail can remain extended while the other handrail is retracted (see FIGS. 3A-3C).

The embodiment in FIGS. 1A-1C thus provides two opposing trusses each shaped as a right triangle, with linkages therebetween to ensure the vertical sides of the respective right triangle trusses remain parallel and coplanar to one another, and to ensure the horizontal sides of the respective right triangle trusses remain parallel and coplanar to one another. Such linkages thus constrain the angles between the vertical and horizontal sides of the respective right triangle trusses each to maintain a right angle of 90 degrees. The hypotenuse members of the right triangle trusses meanwhile can have different lengths, and the horizontal sides of the right triangle trusses can have different lengths, so the hypotenuse members can but need not be coplanar but rather could lie in different planes. In some embodiments, the vertical sides of the right triangle trusses can also be set to have different lengths, or such vertical sides may have fixed (non-adjustable) lengths. Furthermore, the spacing between the two right triangle trusses may be fixed or adjustable, and the frame may be otherwise constructed so the opposing right triangle trusses are and remain parallel to one another and the overall frame thus defines a triangular prism shape with one (imaginary) vertical (back) face and one (imaginary) horizontal (bottom) face.

In this example design, the (imaginary) front (hypotenuse) "face" of the prism-shaped frame structure is entirely open with no connecting elements between the hypotenuse members of the two opposing triangular side trusses. The resulting triangular prismatic shaped frame is symmetrical, with each of the two triangular side trusses being identical in overall configuration but with the possibility in some embodiments that the subject can change the hypotenuse member length and thus the shape of one triangle frame structure relative to the other, or change the dimensions and thus the shapes of both triangle frame structures together, thus distorting the regular triangular prismatic shape of the frame while each of the two triangular side trusses remains shaped as a right triangle. Meanwhile, when a subject occupies the space between the two triangular side trusses in one embodiment, no part of the frame structure is suspended directly above the subject and the subject can readily grasp the hypotenuse members of each of the two triangle side trusses by extending the arms slightly to either side.

Figure 2A:
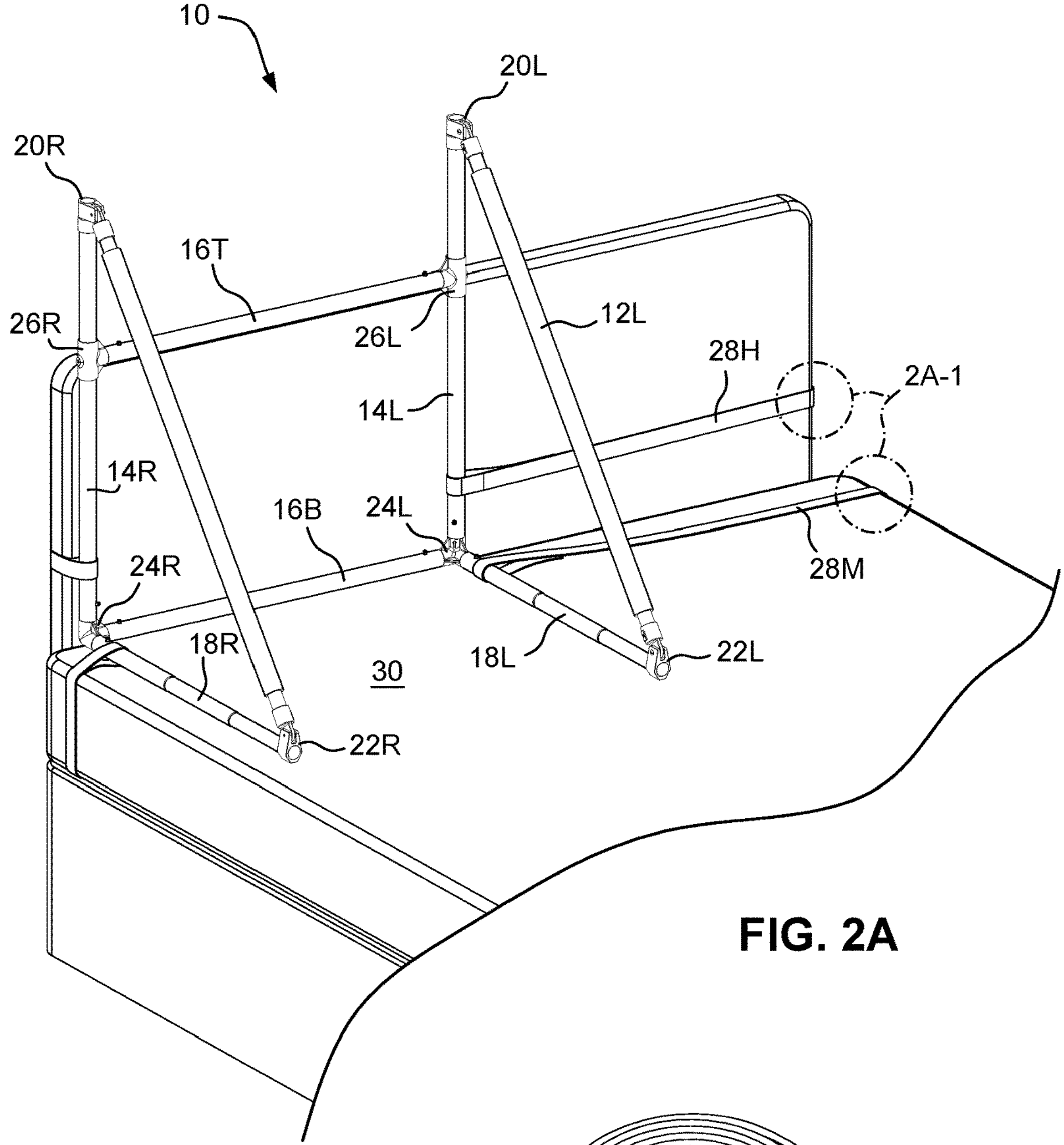
FIG. 2A shows the FIG. 1A view with an embodiment of an anchoring strap and options for installing the anchoring system.
Figures 1, 2A:
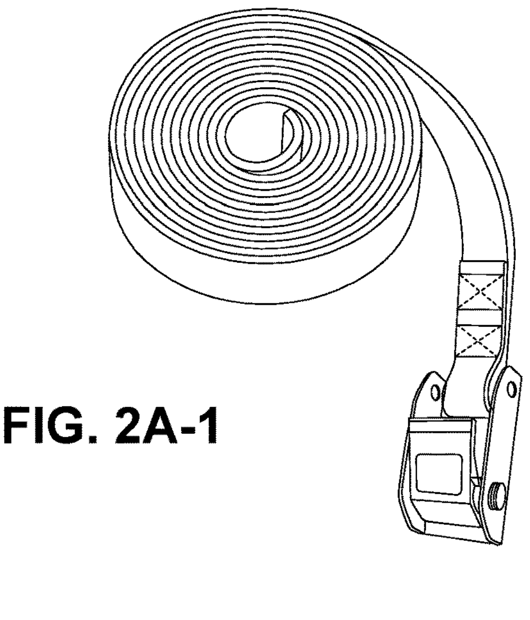
Figure 2B:
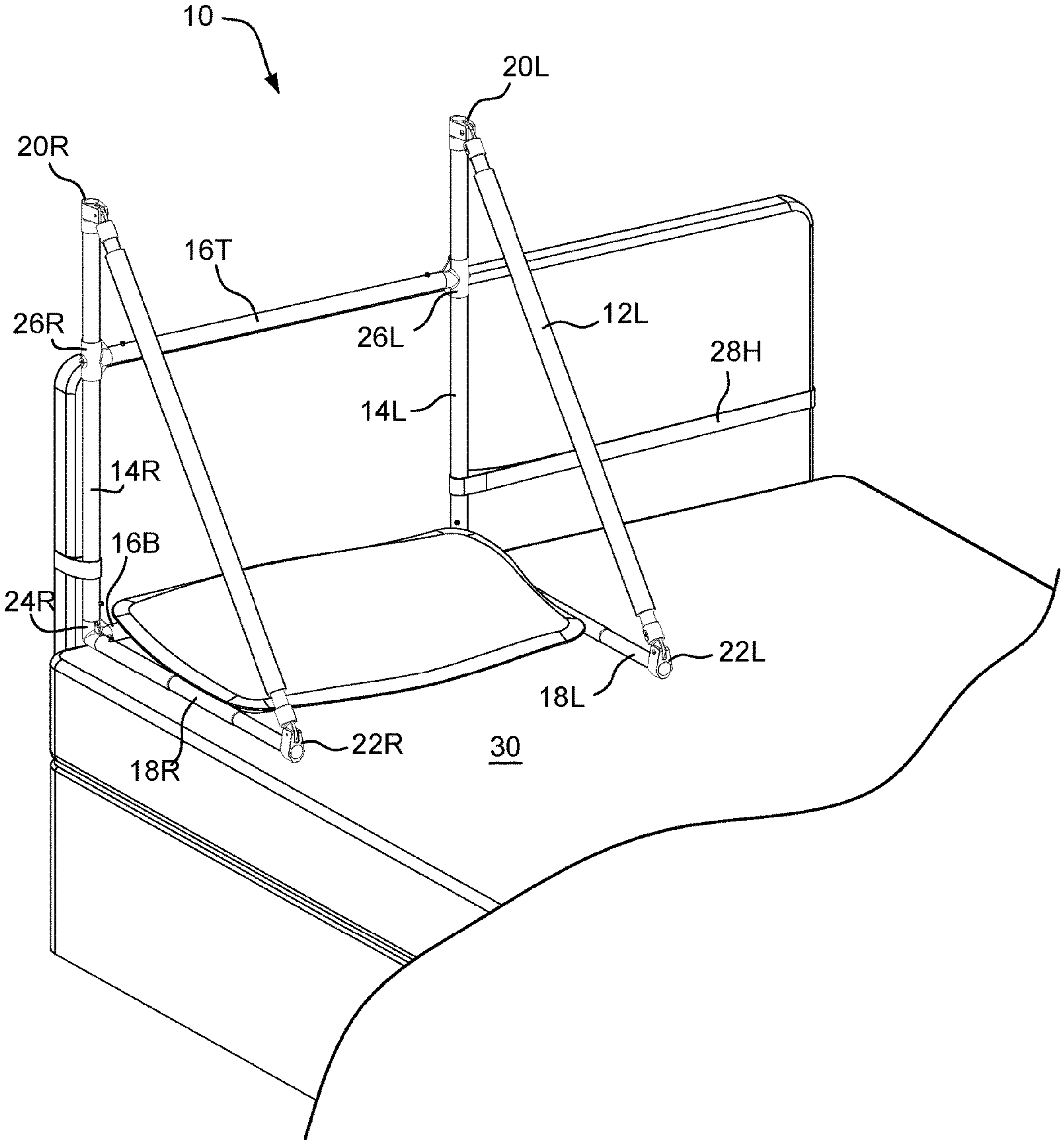
FIG. 2B shows the elevated view option of anchoring the railing system with the strap to a headboard of the bed.
Figure 2C:
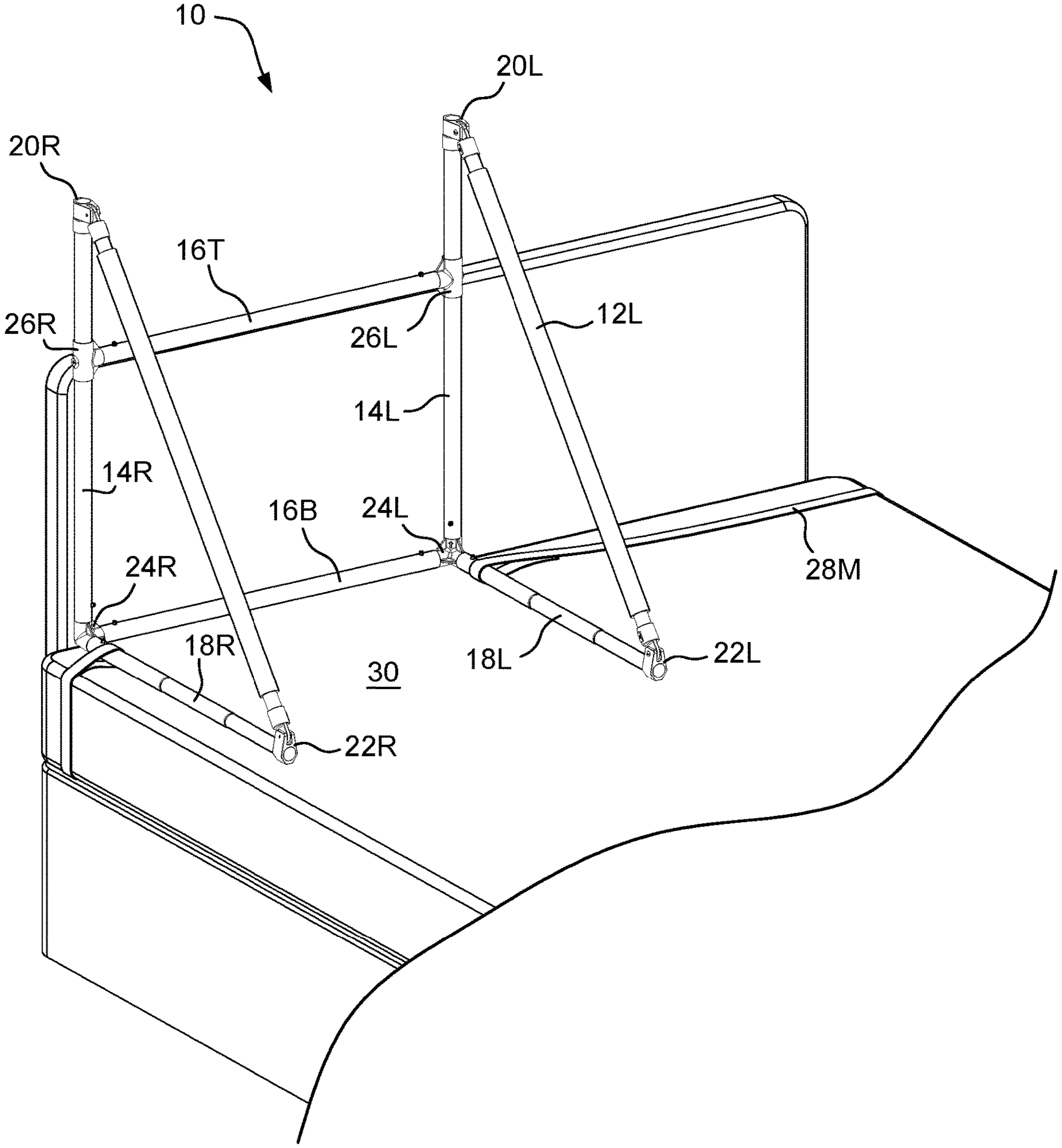
FIG. 2C shows the elevated view of anchoring the railing system with the strap to a mattress or bed frame.
Figure 2D:
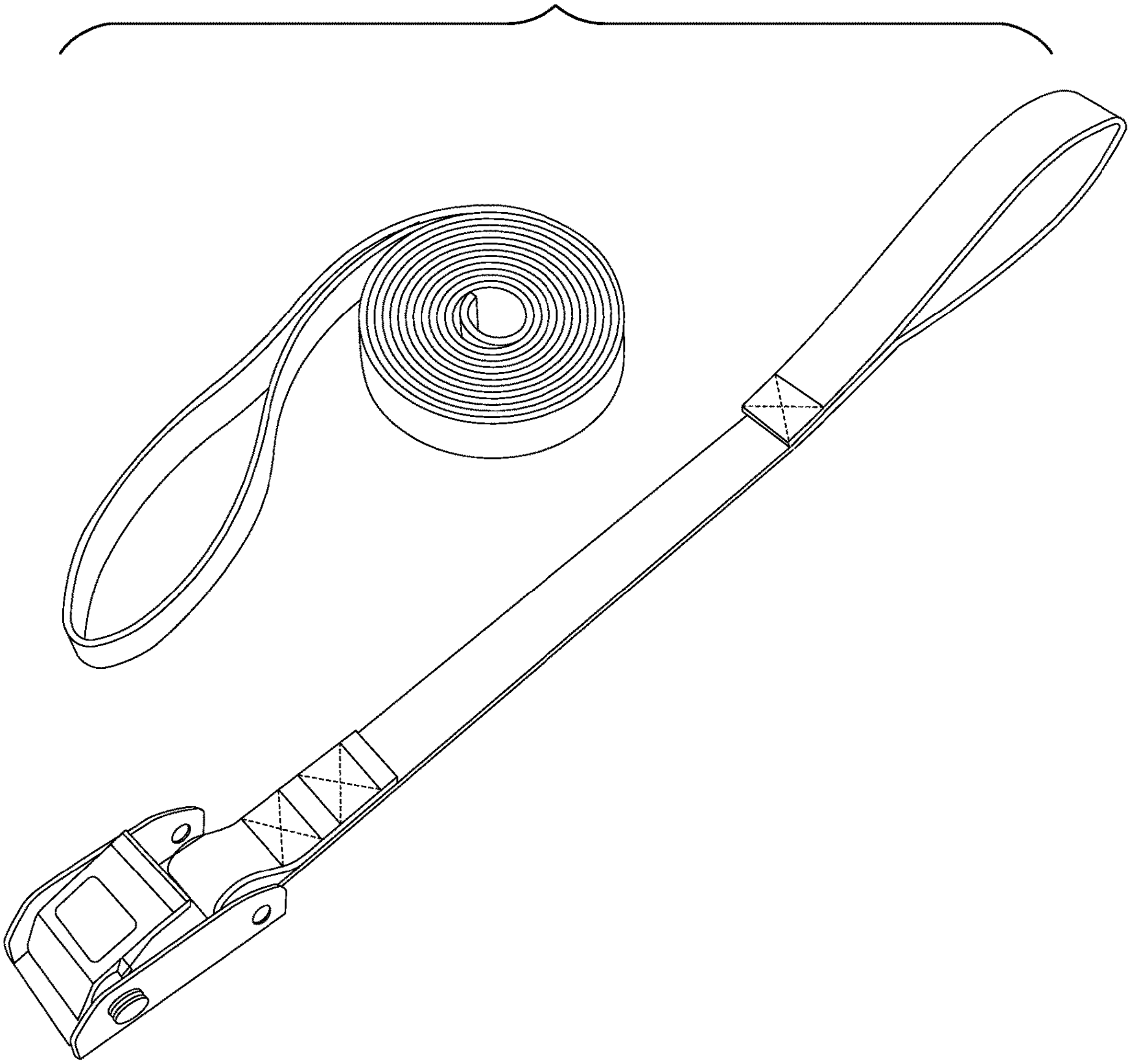
FIG. 2D shows an embodiment of a buckle strap with loops.

In the example shown, as FIG. 1A details, an additional anchoring element 28 is mounted to the frame structure 10 to anchor the frame structure to the bed. One example embodiment shown in FIG. 1A shows the strap mounted to side frame members 14L, 14R via a loop around the pole. The strap 28H is then wrapped around the back of the headboard of the bed frame and tightened via a Cam Buckle component (FIG. 2A-1) to hold the frame structure 10 in place. Another example embodiment shown in FIG. 1A has the strap mounted to bottom frame members 18L, 18R via a loop around the pole. The strap 28M is then wrapped under the mattress or bed frame and tightened via a Cam Buckle component (FIG. 2A-1) to hold the frame structure 10 in place using the mattress. In use, the strap holds the apparatus in place without creating a structural disturbance in the way the mattress and bed supports the subject. The strap provides an anchor such that the subject can freely mobilize the apparatus' handrails and therefore mobilize themselves in and out of bed without obstruction.

One non-limiting embodiment thus provides a stable triangular support frame 10 structured to rest on an ordinary sleeping surface such as a bed, a floor, etc. or otherwise be stably mounted around the subject. The support frame 10 may in one embodiment provide multiple members 18L, 18R, 16B that rest on a bed surface on opposite or different sides of the subject and provide a space 30 therebetween where the subject can comfortably rest or sleep. The frame 10 provides a plurality of upwardly angled handrails 12 that are suspended above the subject on either or preferably both sides of the subject. The handrails 12 in one embodiment are elongated and increase in elevation above the subject as they project further toward the head of the bed and/or the head of the subject. These handrails 12 are dimensioned to provide a plain or succession of grasping surfaces and structures the subject can grasp with her or his hands.

Because the frame is triangularly-shaped (i.e., comprises to triangular trusses) in one embodiment, it provides great strength. When a load is applied to the hypotenuse elements by grasping them and using them for support, the hypotenuse elements distribute the force of the load to each of the horizontal and vertical sides. Specifically, a downward force applied to a hypotenuse member will be resolved by the structure into horizontal and vertical components. The downward force component will tend to compress the vertical elements and thus apply force into the compressible material of the mattress. The rearward force component will tend to compress the horizontal members but because they are in contact with the surface of the mattress (and in some installations the vertical members may be in contact with the headboard of the bed, or the wall behind the head of the bed), the frame structure will remain stationary instead of moving backwards appreciably. The frame structure under load will therefore be able to remain stationary while potentially supporting great amounts of force.

Figure 5:
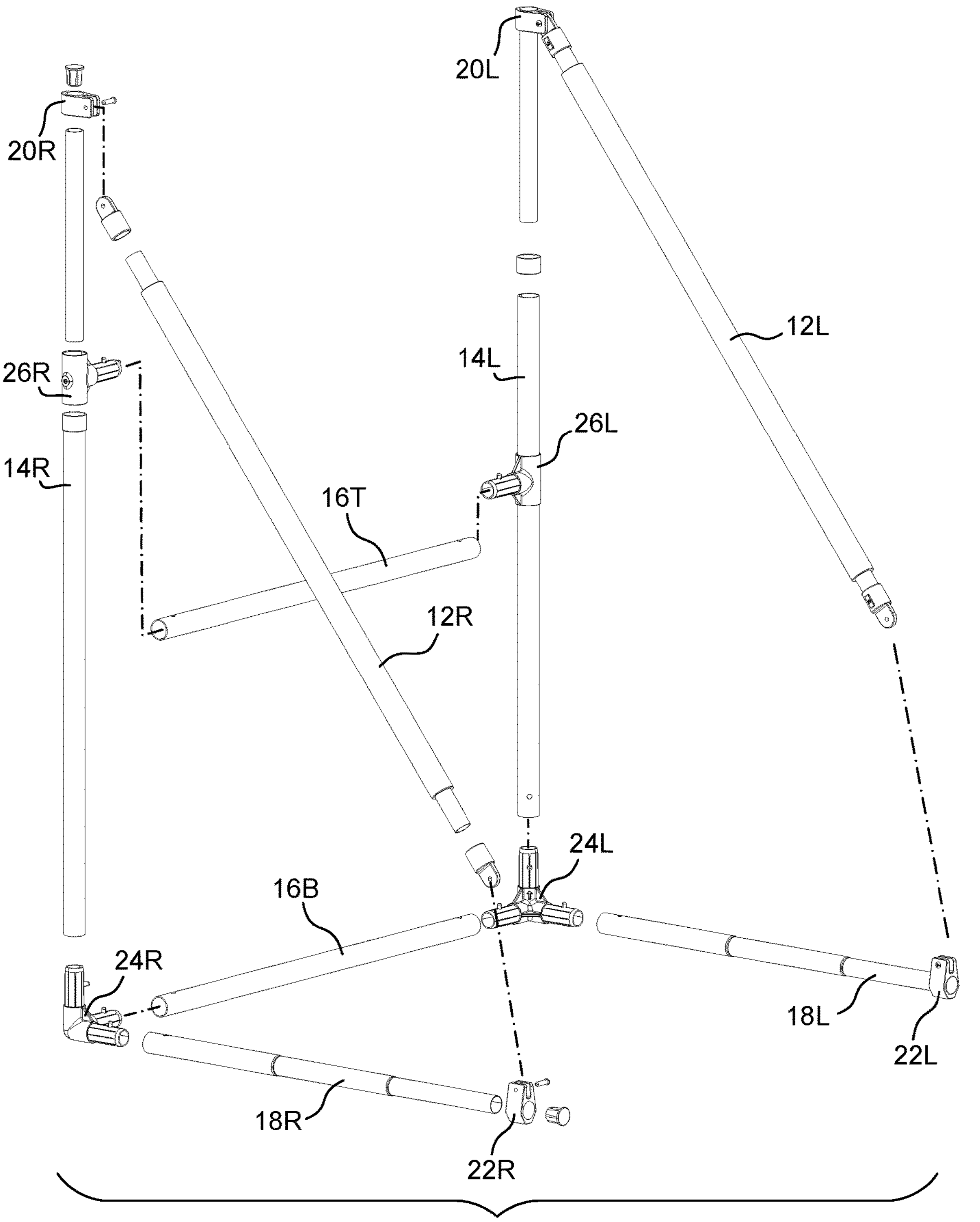
FIG. 5 shows an exploded view of an embodiment with various parts for assembly of the railing system.

FIG. 5 shows an example exploded view of the apparatus. In the example shown, the side rails 14 and 18 each comprise telescoping cylindrical rods, whereas the hand rails 12 comprise fixed length rods (although these rods could also be telescoping or could be made in different lengths for differently sized subjects). In the example, shown, the vertical members 18 may comprise two pieces in which one smaller tube sits inside the larger such that when the unit is in use (arm railings are completely extended) the smaller vertical member sits completely inside of the larger member. Conversely, when the unit is collapsed (arm rails are not completely extended), the smaller vertical member will be forced upward out of the larger vertical member. In one embodiment, these telescoping members are restrained at length by the geometry of the structure. The smaller internal pole is dimensioned to be long enough so that it doesn't pop out of the larger when the unit is collapsed.

In more detail, the upper horizontal connecting member (16T) in one embodiment is not a part of the telescoping mechanism. It is limited by the height of the vertical pole (14L) and acts separately from the telescoping arrangement. The vertical telescoping mechanism essentially is two poles, one that sits inside the other such that when the unit is in use (arm railings are completely extended) the smaller vertical member sits completely inside of the larger member. Conversely, when the unit is collapsed (arm rails are not completely extended), the smaller vertical member will be forced upward relative to the larger (in circumference) vertical member. Unlike other horizontal telescoping parts of the apparatus in one embodiment, these telescopes are not stopped by internal pieces (limiting the expansion); rather, these telescoping members are restrained at length by the geometry of the structure. The smaller (in circumference) internal pole is dimensioned to be long enough that it doesn't pop out of the larger in circumference pole with which it is coaxial. A joining ring between the larger (in circumference) and smaller (n circumference) poles may be provided to cover the opening of the larger (in circumference) pole to give it a finished look.

Meanwhile, the horizontal telescoping arrangement that rests on the bed is, in one embodiment, limited by the lengths of each section of the pole. It may be structured to "lock" into place via an indentation system where the end of the larger (in circumference) pole curves inward and the smaller (in circumference) pole inside the larger pole and coaxial with the larger pole has an indentation outwards so that the two poles catch each other and do not come apart. This arrangement can repeats at each connection point between the different lengths, so the poles can collapse inwardly but don't fall apart outwardly.

In the example shown, each "vertex" of the overall triangle prismatic structure opposite the hypotenuse comprises a 3-axis joining structure that maintains 90 degree angles between three joining members. As mentioned above, pivoting collars are used to connect the ends of the hypotenuse members to the horizontal and vertical elements to provide joining angles that can change as the lengths of the horizontal and vertical elements lengths are changed. Other embodiments could dispense with pivoting connections and use fixed angle connections instead at the expense of loss of adjustability (the apparatus could be manufactured in a number of different fixed sizes to accommodate differently sized subjects).

Figure 5A:
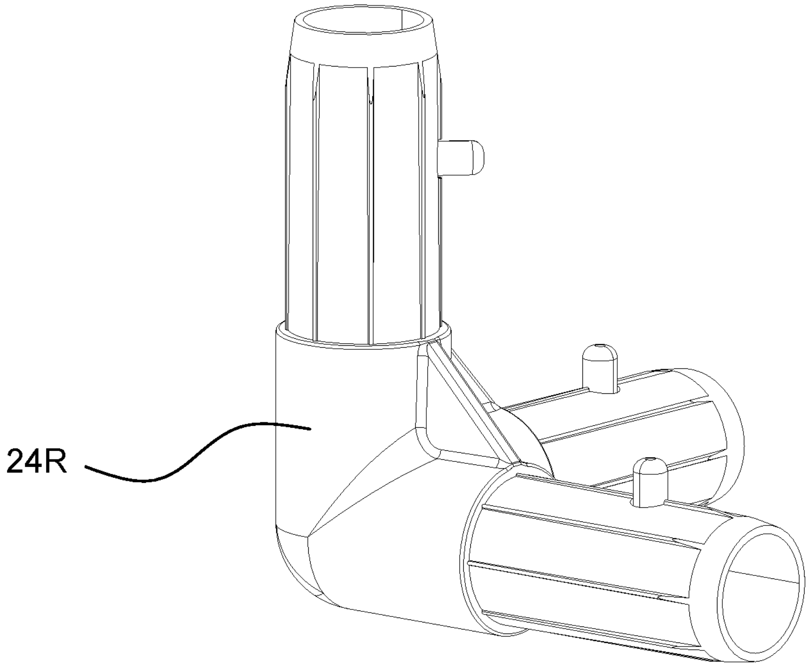
FIG. 5A shows three way elbow couplings.

In more detail, the FIG. 5 exploded view and FIG. 5A shows that connection sites of the L-Shaped substructures and the lower horizontal connecting member are held together by three-way elbow coupling mechanisms or corner fittings, such three-way fittings having appendages on the x, y and z planes wherein the angles are all at 90 degrees, such corner fittings accepting three segments of members: vertical telescoping members, horizontal telescoping members and horizontal connecting members.

Figure 5B:
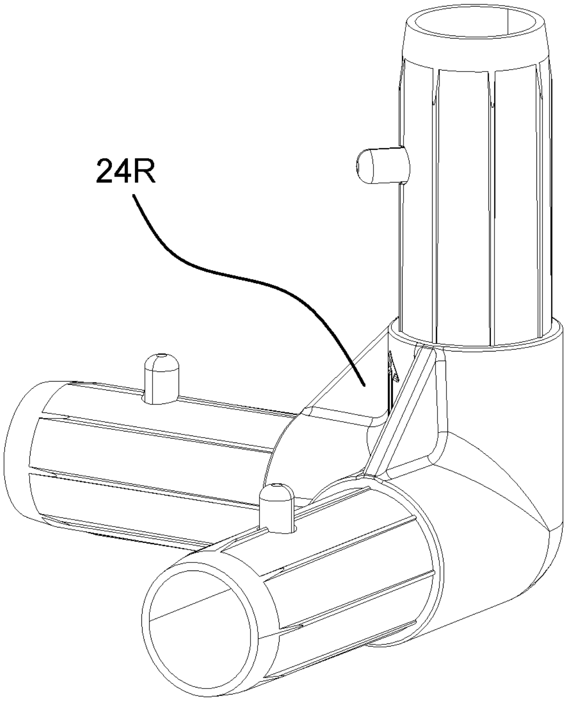
FIG. 5B shows a three way elbow coupling consisting of tube locking spring button clips that lock into the structure to keep them connected.
Figure 5C:
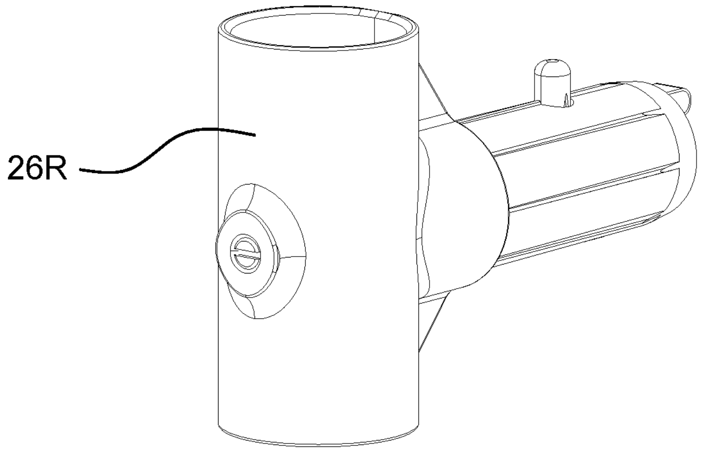
FIG. 5C shows Tee couplings consisting of two sockets inline and one perpendicular appendage so that the angles are 90 degrees, the socket aspect of the Tee coupling fitting around or semi around the vertical telescoping members while the perpendicular appendage connects to the second horizontal connecting member.
Figure 5D:
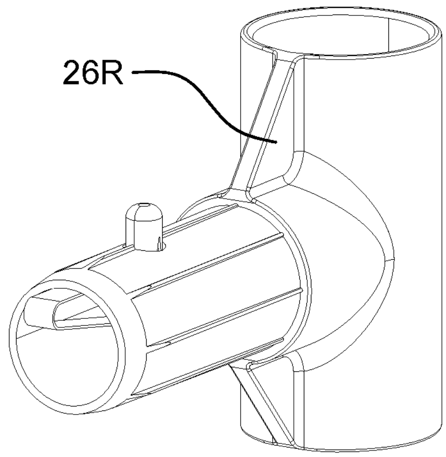
FIG. 5D shows Tee coupling appendages consisting of tube locking spring button clips that lock into the structure to keep them connected.

FIG. 5 and FIG. 5C shows connection sites of the upper horizontal connecting member and the vertical telescoping members are held together with Tee couplings consisting of two sockets inline and one perpendicular appendage so that the angles are 90 degrees, the socket aspect of the Tee coupling fitting around or semi around the vertical telescoping members while the perpendicular appendage connects to the second horizontal connecting member.

FIG. 5 further shows that an upper horizontal connecting member is adjustable in that it can be moved by sliding the Tee couplings lower or higher along the vertical telescoping members, thus creating an infinite range of rectangular sized subframes on the back plane of the structure.

FIG. 5 and FIG. 5B shows elbow couplings consisting of tube locking spring button clips that lock into the structure to keep them connected.

FIG. 5 and FIG. 5C shows tee coupling appendages consisting of tube locking spring button clips that lock into the structure to keep them connected.

Figure 5E:
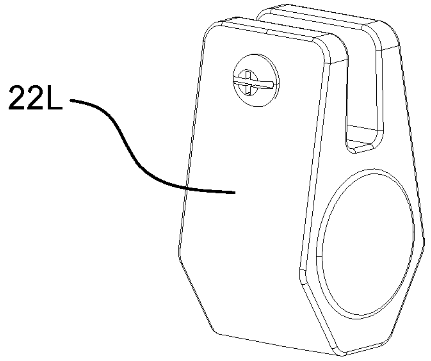
FIGS. 5E-5G show detail of hinge parts that enable telescoping movement and collapsibility of rails.
Figure 5F:
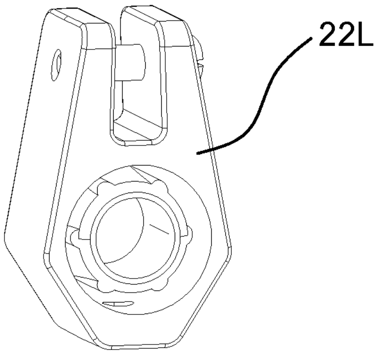
Figure 5G:
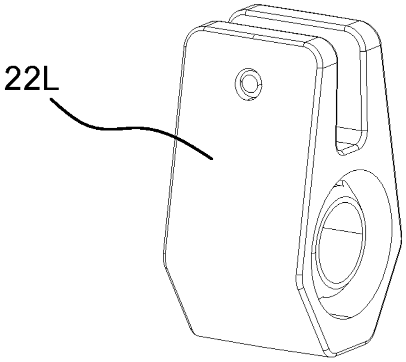

FIG. 5E, 5F, 5G show example connections between each of the frame members.

Figure 6A:
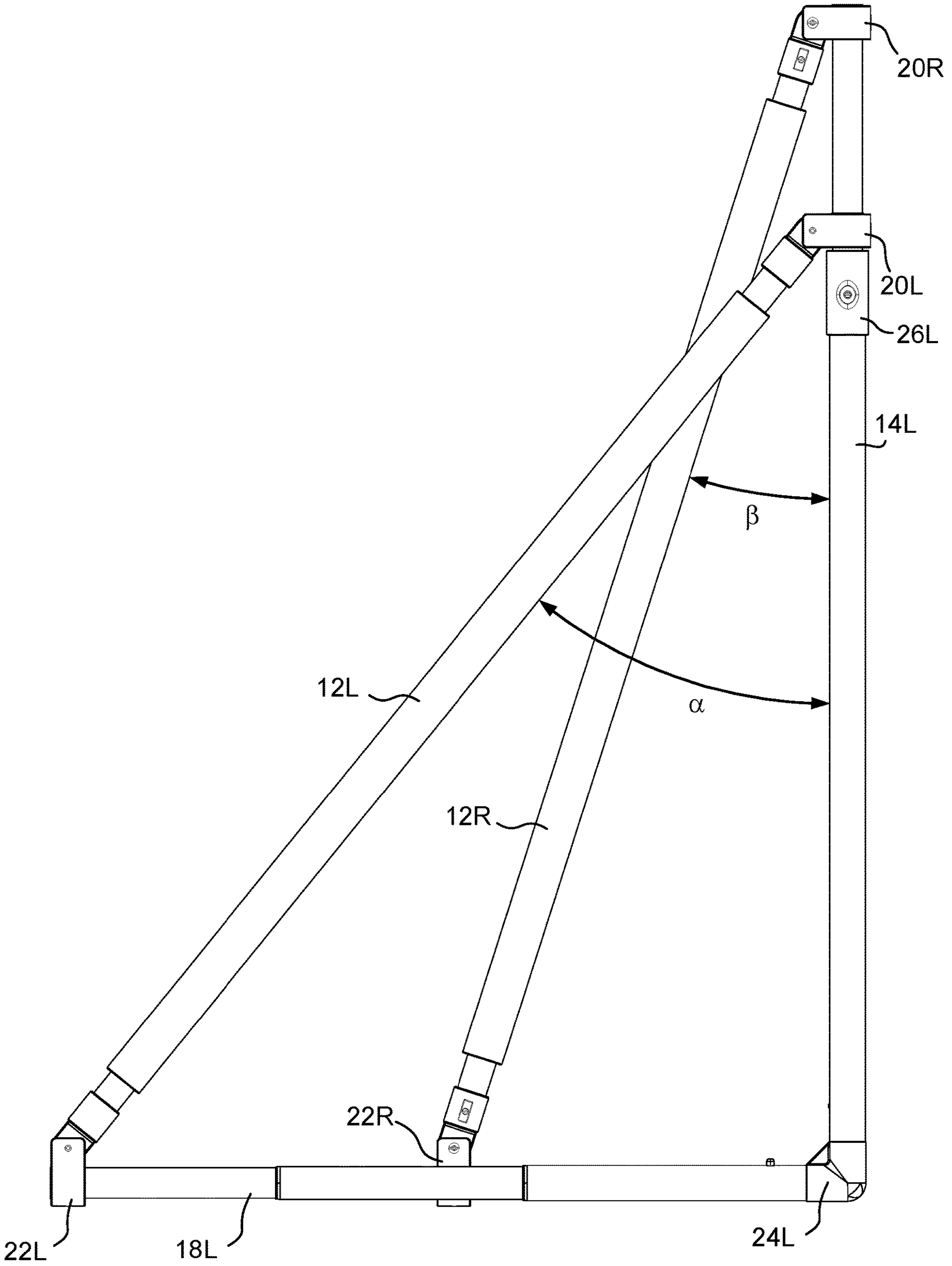
FIG. 6A shows a view of an example embodiment having collapsibility of the arm rail and the angles at which it can potentially collapse.

The FIG. 6A side view of a triangular truss shows two example axis-to-axis angles $\alpha$ and $\beta$ between hypotenuse element 12 and vertical element 14 of:

$\alpha$=39.0 degrees and $\beta$=17.9 degrees.

Thus, by expanding or contracting the length of telescoping element 18, any angle between these two angles can be obtained, e.g., 20 degrees or 22 degrees or 25 degrees or 28 degrees or 30 degrees or 32 degrees or 34 degrees or 35 degrees or 37 degrees or 38 degrees or any angles therebetween. As mentioned above, other embodiments may not be adjustable but rather are designed to have a fixed angle. However, as explained below, an advantage of having at least one side of the frame retractable is that it can retract so as not to obstruct the subject getting out of bed.

Figure 6B:
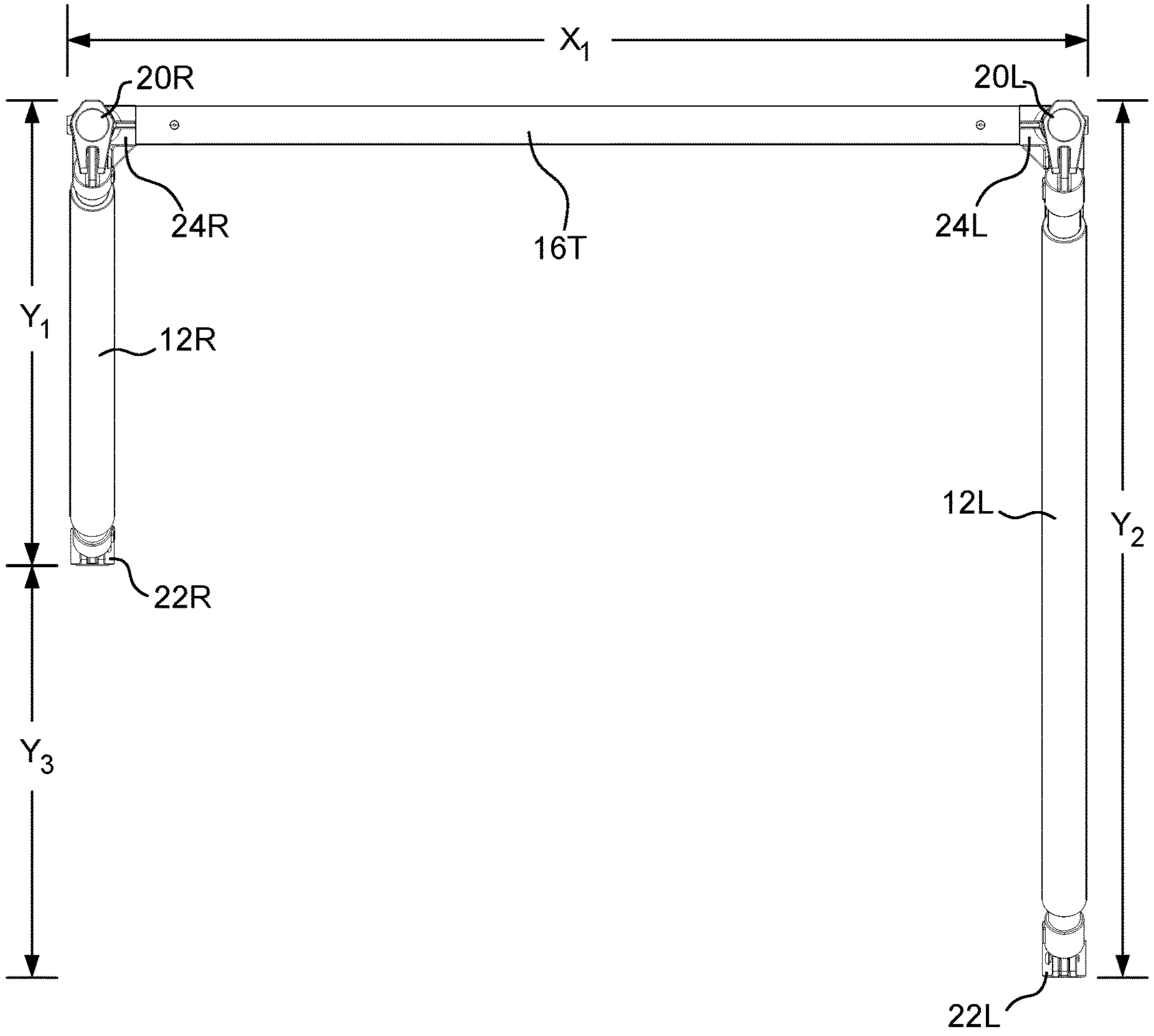
FIG. 6B shows a bird's eye elevated view of an embodiment with the right-side handrail collapsed.

The FIG. 6B birds eye view of the frame looking downward shows the following exemplary dimensions:

X1=31.4 inches (fixed in one embodiment)

Y1=14.5 inches

Y2=27.1 inches

Y3=12.6 inches

Thus, the handrail members 12 can be adjusted in this embodiment between 14.5 inches extension across the bed to 27.1 inches extension across the bed (the amount of adjustment being 12.6 inches). The projection of the handrails 12L onto the bed may thus have sizes of 14.5 inches or 15 inches or 16 inches or 17 inches or 18 inches or 19 inches or 20 inches or 21 inches or 22 inches or 23 inches or 24 inches or 25 inches or 26 inches or 27 inches or any length therebetween. It should be noted that these lengths are of the projections of the handrails onto the bed, not the actual lengths of the handrails.

Figure 6C:
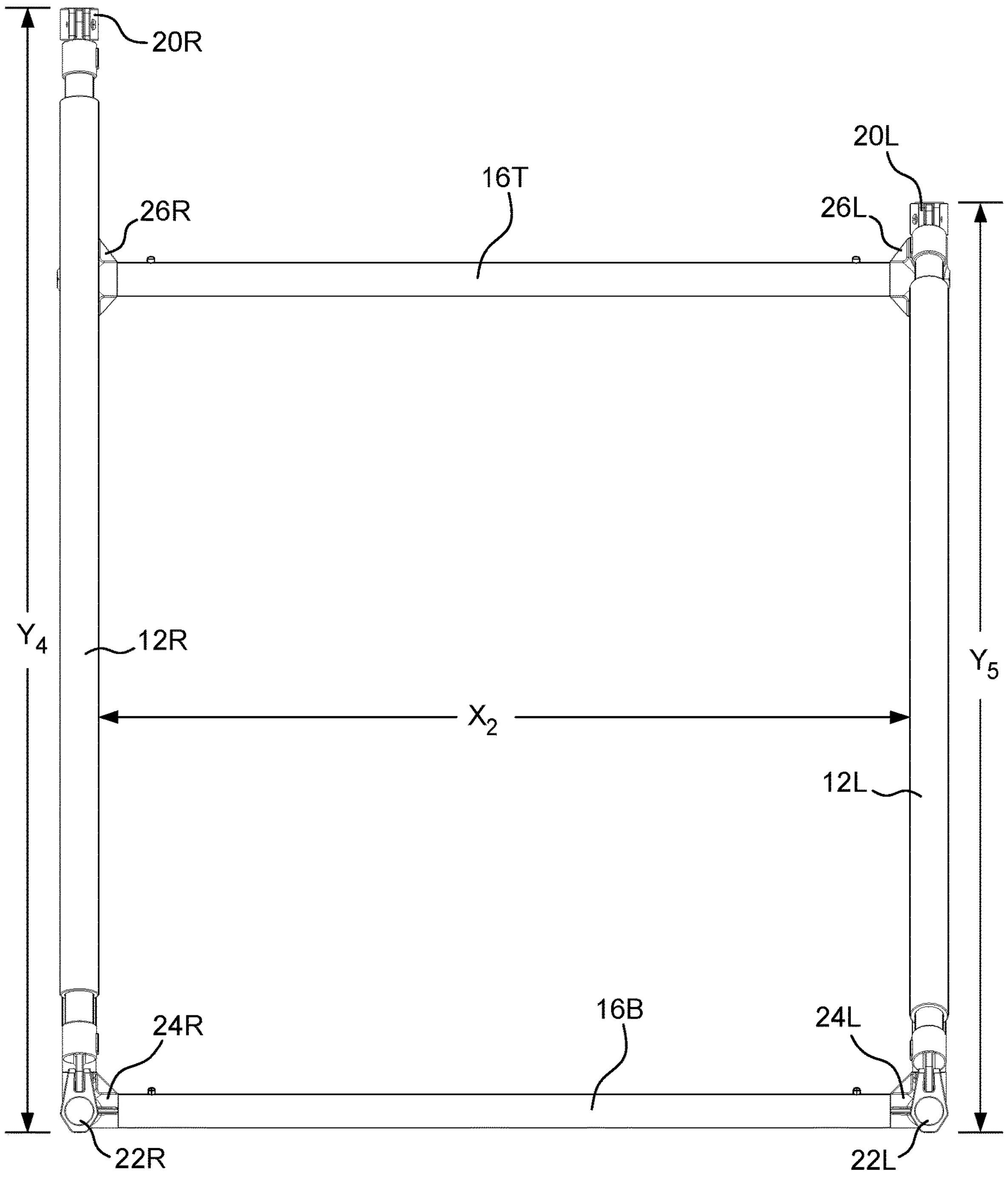
FIG. 6C shows a front elevated view of an embodiment with the left-side handrail collapsed.

The FIG. 6C front view shows the following exemplary dimensions:

Y4=39.7 inches

Y5=32.9 inches

X2=28.6 inches (fixed)

This Figure thus shows in that in one embodiment the length (height) of the vertical members 14 can be adjusted from 32.9 inches to 39.7 inches to provide lengths of for example 33 inches or 34 inches or 35 inches or 36 inches or 37 inches or 38 inches or 39 inches or any length in between. In this example, the spacing between the vertical members 14 and thus between the parallel triangle trusses) is fixed at 28.6 inches but other embodiments can provide an adjustment here to or provide different fixed length substitutable rear horizontal members 16B.

Example Method of Use

FIGS. 7A-7H are together a flip chart animation showing how a subject can use the support frame 10 to lift herself from a supine position to a sitting position. To view this flip chart animation, please adjust the size of your image viewer to match the size of the Figure and, starting from FIG. 7A, successively press your "page down" button to proceed through the figures.

Figure 7A:
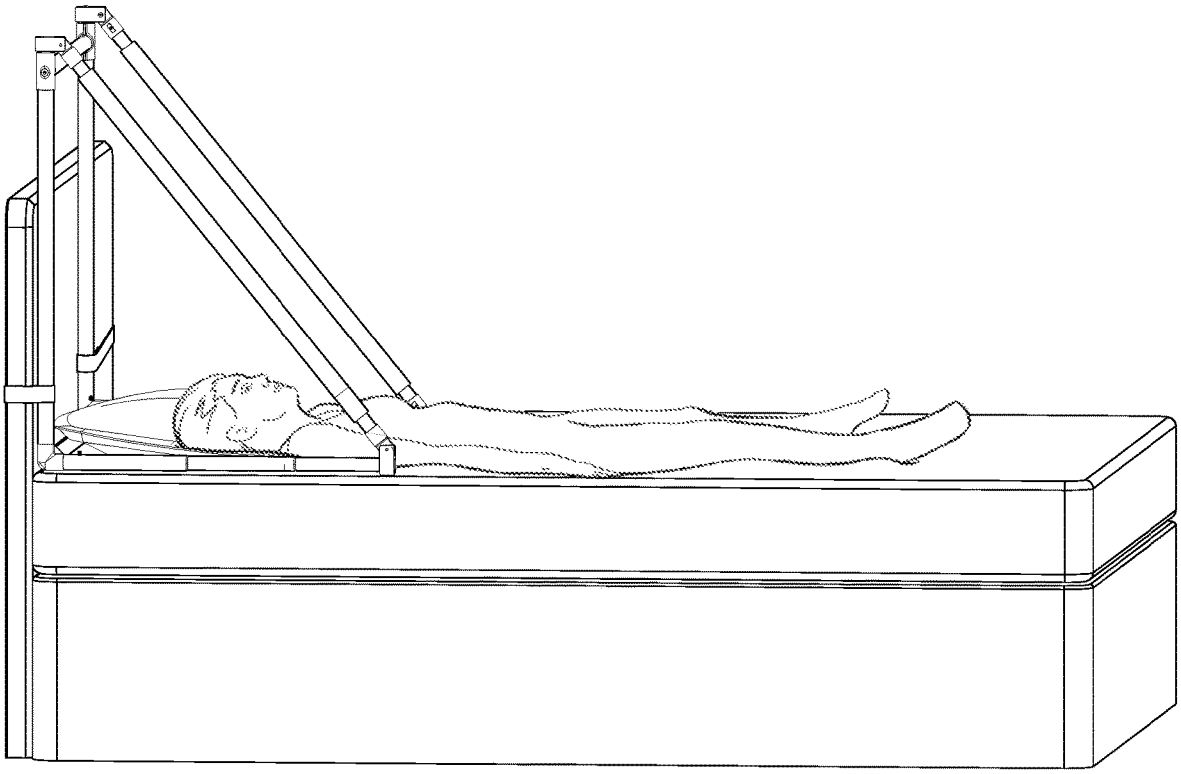
FIGS. 7A-7H are together a flip chart animation showing an example method of utilizing a retractable embodiment.
Figure 7B:
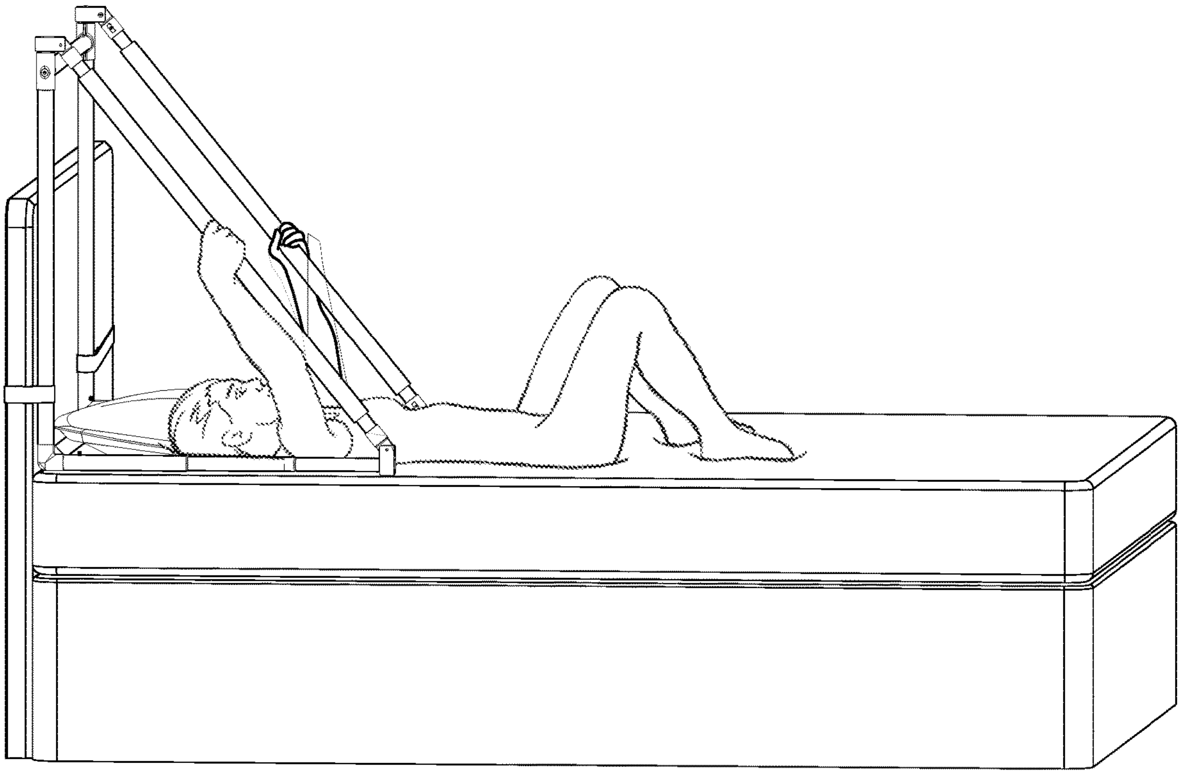
Figure 7C:
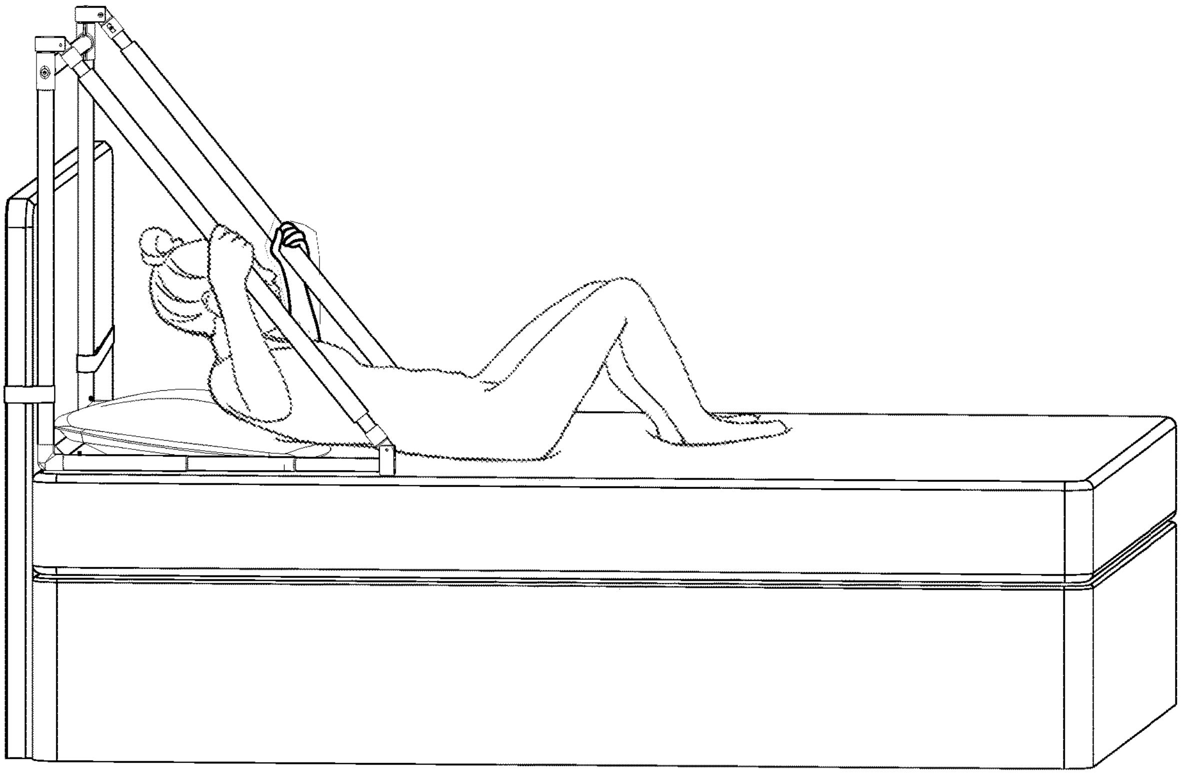
Figure 7D:
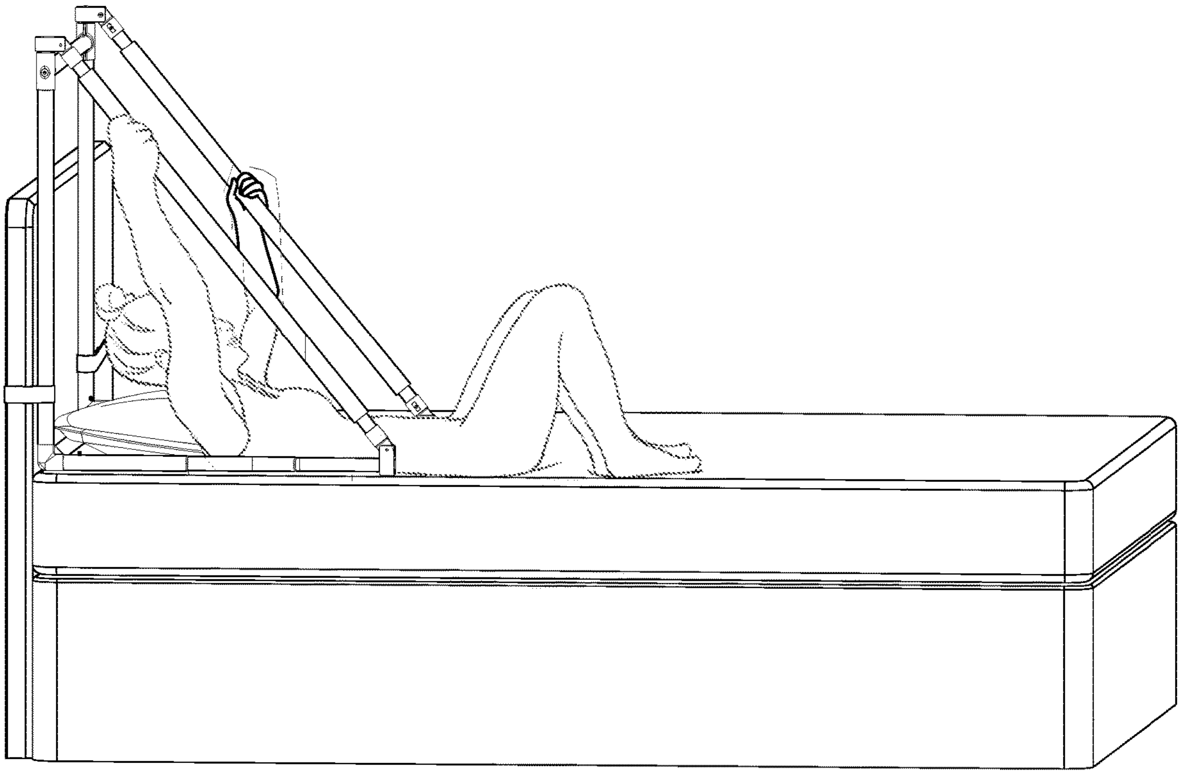
Figure 7E:
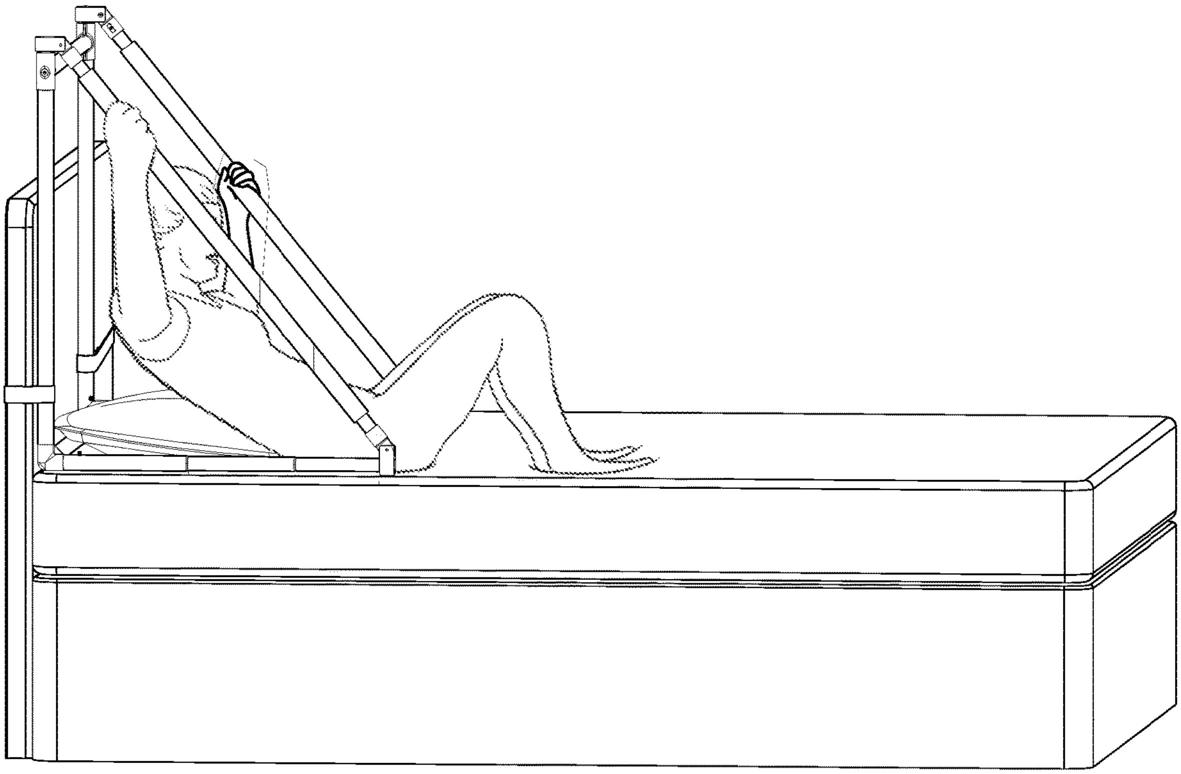
Figure 7F:
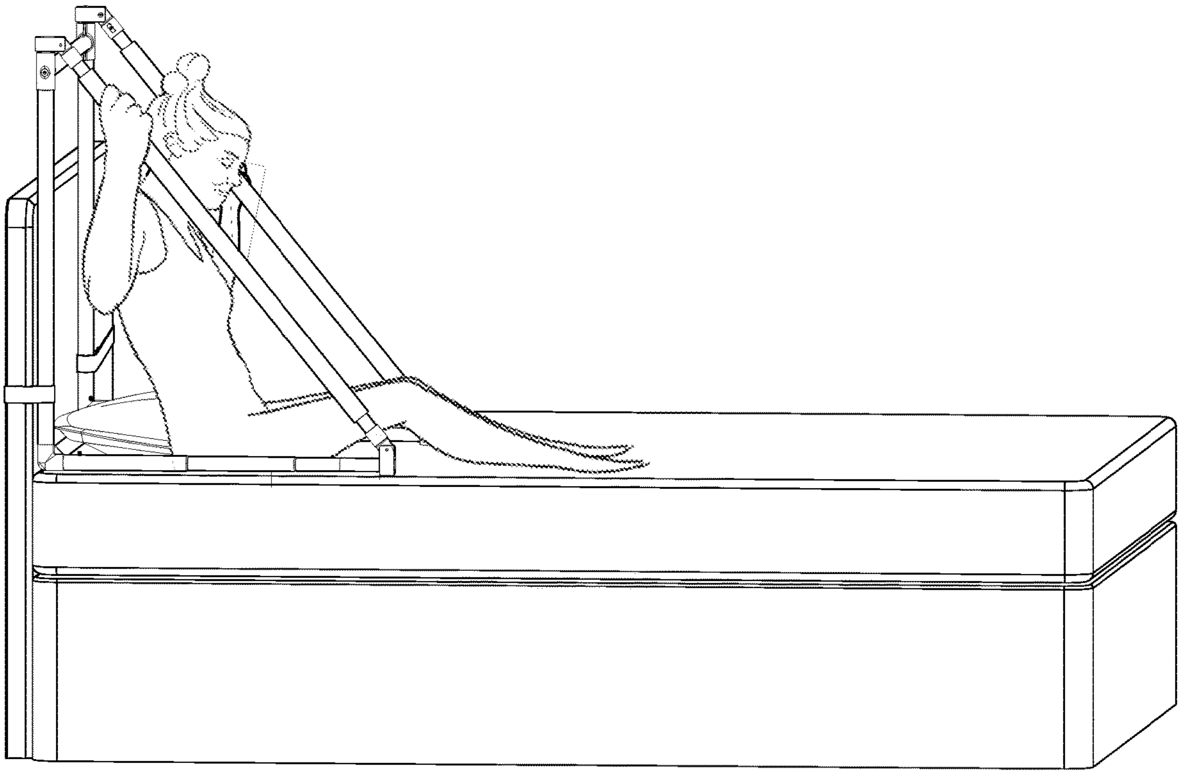

To utilize, from a supine position (FIG. 7A), the subject grips the top/side of the handrails with their hands (one on each side) and pulls themselves upward (FIG. 7B). In more detail, from a supine position (FIG. 7A), the subject reaches her or his arms directly up and in line with their head to grasp the handrail on each side above them while simultaneously bending their knees to approximately a forty-five-degree angle (FIG. 7B). The subject thus simultaneously bends their knees to approximately forty-five degrees and pushes through the heels of their feet to lift and swing their hips in a backward motion toward the head of the bed. See FIG. 7C. All body weight should be held in the upper and lower body at this point. This allows subject to take virtually all pressure off their abdomen (i.e., the subject's abdominal muscles are not being used to lift or maintain the subject in a non-supine position) and instead utilize only arm and leg strength to lift and reposition their hips closer to the head of the bed to sit up right.

Figure 7G:
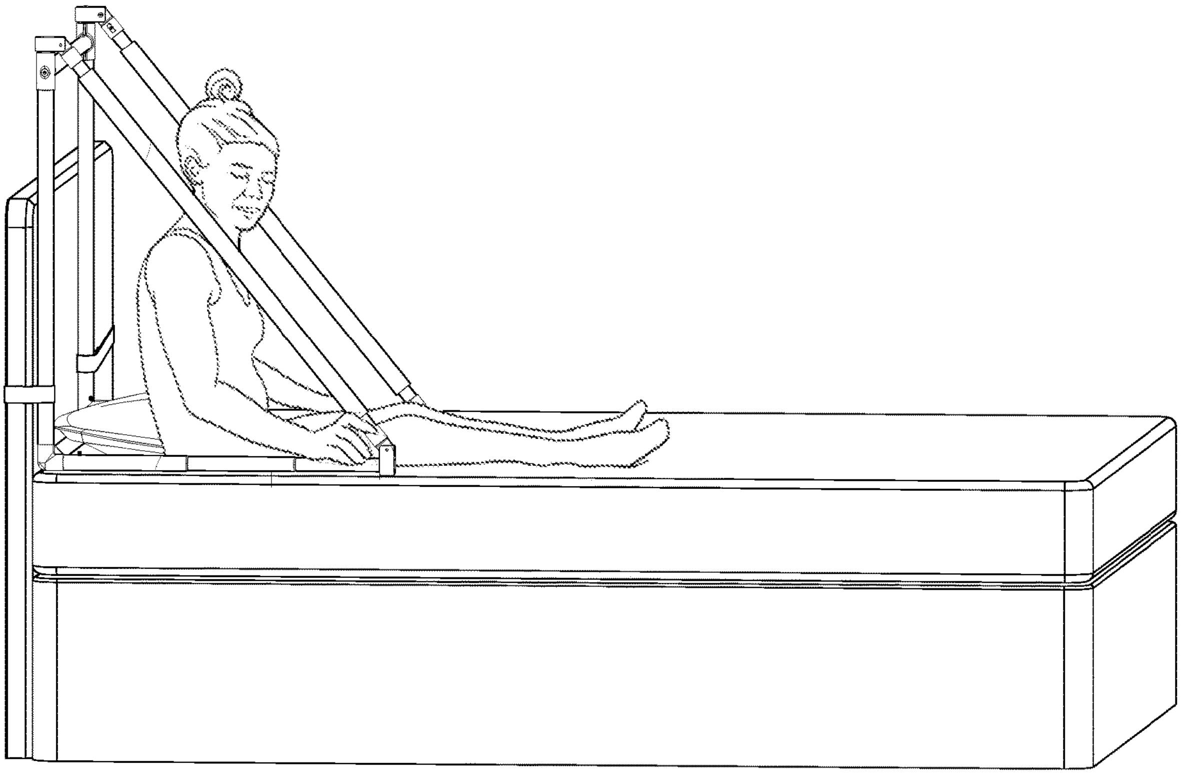
Figure 7H:
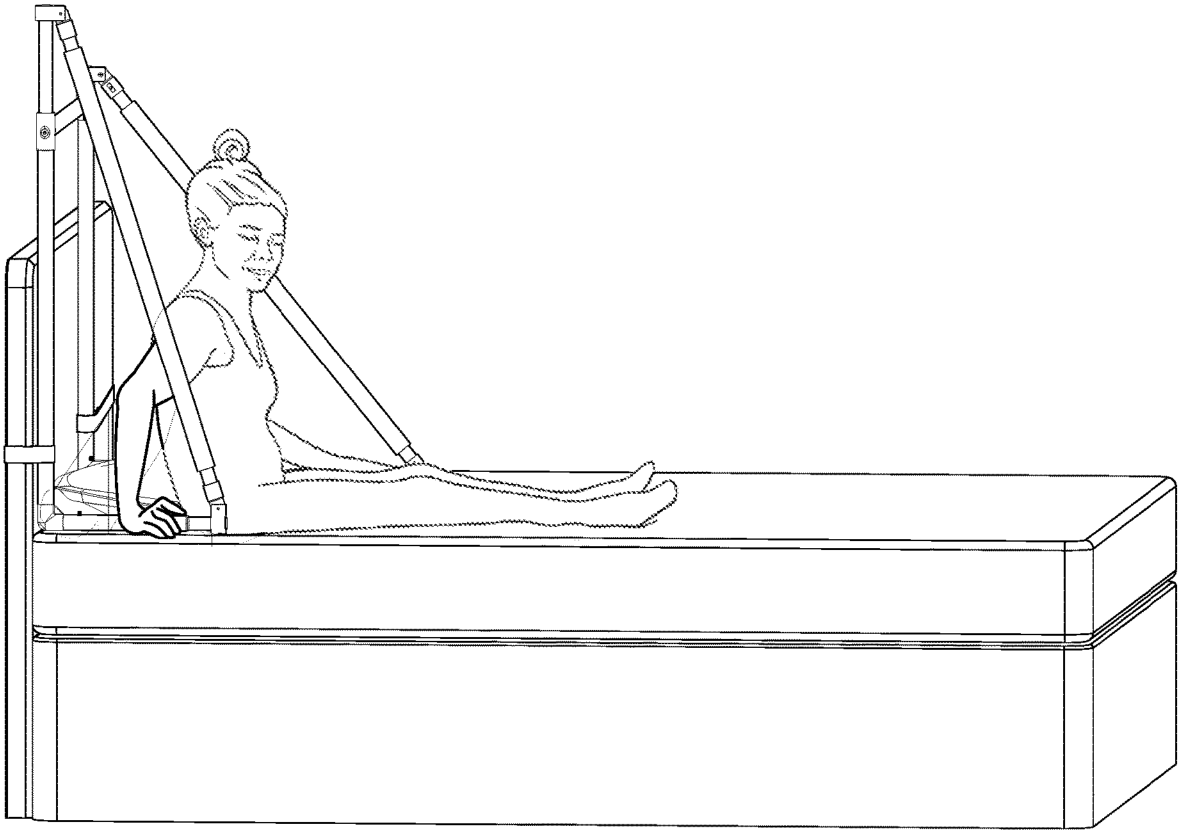

The subject thus uses their arm and shoulder muscles to lift their upper body while shifting their hips backward (FIG. 7C to 7D) toward the head of the bed. The subject's weight remains distributed in their arms and legs during this motion—relieving pressure on their abdomen because the abdomen remains completely suspended during any motion. The subject may repeat the motion as many times as needed as they reach their arms higher and higher on the upwardly extending handrails (hypotenuse members) of the frame (which each provide an ascending series of successive cylindrical handhold surfaces) to bring themselves closer to an upright, seated position closer and closer to the headboard of the bed. See FIGS. 7E-7F. As the subject moves her or his hands up the handrails, the subject scoots her or his buttocks closer and closer to the head of the bed, thus moving their entire body laterally toward the end of the bed without putting any tension on their abdominal muscles. The subject thus repeats this motion with their hands moving to higher and higher elevations along the handrails as many times as needed until eventually the subject is in a full seated upright position with their buttocks nearer to the head of the bed than before (FIG. 7G). Once seated, the subject can release the handrails and pull the base of a handrail backward toward the head of the bed, thus collapsing the telescoping railing out the way to get out of bed, reach the nightstand, etc. See FIGS. 7G-7H.

In one embodiment, the handrails 12 themselves have no cross-members therebetween. The absence of cross-members between the handrails 12 avoids obstructions to the subject using handhold after handhold to bring herself or himself into a sitting position. Other embodiments may however include some type of cross-members between the upwardly extending handrails to provide a cage-like structure within additional grasping positions for the subject directly over the subject's body. The handrails are positioned, dimensioned and oriented to be grasped by the fully extended arms above or behind the head of the subject so that the subject may pull themselves up from a supine position to a sitting position by grasping a succession of increasingly elevated handhold positions the handrails provide.

In one embodiment, handrails 12 are able to be set to be symmetrical and parallel, i.e., they ascend above and behind the patient at identical angles for identical distances. As indicated above, the angle at which the handrails ascend is adjustable. However, other embodiments could include asymmetrical grasping members that ascend at different angles and/or for different distances and/or extend outwardly to the lateral sides of the subject's body.

In one example embodiment, the handrails 12 are horizontally collapsible which would allow the subject free movement in and out of bed by mobilizing the structure out of the way. One such feature would be the base of the rails attached to a telescoping mechanism. This would allow the railing incline to be positioned anywhere from a 0 degree angle to <45 degrees from the top pivot pin. Other embodiments could be any suitable collapsing arrangements such as track system that allows the side rails to slide forward and backward, hinging outwardly, folding inwardly, or the like for obtaining the handrails removability. In still other embodiments, the handrails do not collapse or retract, or only one handrail collapses or retracts.

In one embodiment, the upwardly extending handrails are rigid, tubular, straight, and cylindrical in cross-section. Other embodiments could use different grasping member shapes such as flexible or semi-rigid filaments, a meandering upwardly-extending series of defined stepwise handhold or handle portions, a series of rings suspended at different heights, netting, or other grasping arrangements that extend upwardly away from the subject and enable the subject to lift her or his upper body using a progression of handhold landings.

In one embodiment, the upwardly extending handrails are one inch in diameter and made from aluminum or hard plastic. They may be encased in a dense foam for superior grip experience. Other embodiments could be a larger or smaller diameter, with or without being covered in dense foam. The handrails could also be made from, but not limited to, PVC, fiberglass, aluminum alloy, titanium, plastic, steel, etc.

In one embodiment, the overall frame may further include an anchoring support structure to the side or rear of the structure that provides stable support for the structure on top of the mattress. This anchoring support structure may in one embodiment include vertical members that are positioned, dimensioned and structured to attach to the horizontal segment of the arm railing system. These vertical members are in use customized to the size of the height of the mattress through an adjustable telescoping mechanism.

In one embodiment, these downwardly extending vertical pinning members may terminate in perpendicular anchoring members that are structured to extend beneath the mattress, possibly the box spring, and thus the subject. These perpendicular anchoring members use the subject's own weight to provide stability for the support frame. These vertical and horizontal members combined retain the support frame on the bed without requiring any additional fasteners, tape, rope, bungees etc. and without requiring any modification or damage to the bed frame or mattress. Other embodiments could use any suitable anchoring arrangements such as filaments, rigid or flexible sheets, or the like for helping to retain the support frame to the mattress structure of the bed.

In one example embodiment, the overall structure is (32.9"-39.7")×(31.4")×(14.5"-27.1") (H×W×D). These dimensions are selected to provide correct arm reach lengths for the subject (different dimensions could be provided for subjects with different length arms). The anchor strap is 20' in length to fit around any size bed, but customizable using the buckle apparatus to shorten and tighten. The angle the handrails 12 make with the vertical supports can vary from 17.9 degrees to for example 39.0 degrees.

An example non-limiting feature of this apparatus is that it is symmetrical in relation to the subject and has framing behind and on both sides of the subject. This provides the subject with optimal support, stability and allows the subject to use equal strength and have equal mobility on both sides of their body.

An example non-limiting embodiment provides an advantage that it allows the subject the ability to limit the use of their abdominal muscles while increasing their mobility in bed, specifically when sitting up. It allows the subject to lift their body and position their hips backward as they sit up so that they can remain sitting in bed comfortably without having to additionally adjust themselves after they have already sat up. The product reduces strain on the abdominal muscles thereby reducing abdominal pain if the subject is experiencing such.

As discussed above, adjustability can be provided using telescoping tubes or a mechanism like a pool pole in which there is a spring-loaded peg that fits into different holes positioned at different lengths. Such adjustability is used for example to adapt the width of the support structure for different arm spans of different subjects. See for example Anong Tantisuwat et al, "Multi-directional Reach Test: An Investigation of the Limits of Stability of People Aged between 20-79 Years," J Phys Ther Sci. 2014 June; 26(6): 877-880 Published online 2014 Jun. 30. doi: 10.1589/jpts.26.877.

All patents and publications cited herein are incorporated herein by reference.

The above embodiments are described by way of example only. The invention(s) is/are not limited to any particular preferred embodiment(s) disclosed herein but rather are defined in accordance with the spirit and scope of the appended claims.

The invention claimed is:

1. A support structure configured for use in helping a subject to raise themselves to a sitting position from a supine position on a horizontal resting surface of a bed, the support structure comprising:

a first triangular substructure comprising a first vertically telescoping member connected perpendicularly at a respective first base thereof to a first horizontally telescoping member thereby forming a first L-shaped substructure having a first distal end and a second distal end, and a first grasping member connected between the first distal end and the second distal end;

a second triangular substructure comprising a second vertically telescoping member connected perpendicularly at a respective second base thereof to a second horizontally telescoping member thereby forming a second L-shaped substructure having a third distal end and a fourth distal end, and a second grasping member connected between the third distal end and the fourth distal end;

a first horizontal cross-member connecting the first base of the first vertically telescoping member to the second base of the second vertically telescoping member; and a second horizontal cross-member further connecting the first vertically telescoping member to the second vertically telescoping member, wherein:

the first horizontal cross-member and the second horizontal cross-member are configured to retain the first triangular substructure in a position that is parallel to and spaced apart from the second triangular substructure, the first horizontally telescoping member, the second horizontally telescoping member and the first horizontal cross-member together are configured to rest on the horizontal resting surface of the bed, and the first vertically telescoping member, the second vertically telescoping member, the first horizontal cross-member and the second horizontal cross-member are configured to define a rectangular vertical back plane perpendicular to the horizontal resting surface of the bed.

2. The support structure of claim 1 wherein connection sites of the first and second triangular substructures and the first horizontal cross-member are held together by three-way elbow coupling mechanisms or three-way corner fittings, such three-way fittings having appendages on orthogonal x, y and z planes, such three-way corner fittings each configured to accept a vertical telescoping member, a horizontal telescoping member, and a horizontal connecting member.

3. The support structure of claim 2 wherein the elbow couplings consist of tube locking spring button clips that lock to keep them connected.

4. The support structure of claim 1 wherein connection sites of the second horizontal cross-member and the first and second vertical telescoping members are held together with Tee couplings consisting of two sockets inline and one perpendicular appendage so that the angles are 90 degrees, the sockets of the Tee coupling fitting around or semi around the first and second vertical telescoping members while the perpendicular appendage connects to the second horizontal cross-member.

5. The support structure of claim 4 wherein the second horizontal cross-member is configured to be moved by sliding the Tee couplings lower or higher along the first and second vertical telescoping members, thereby creating an infinite range of rectangular sized subframes on the back plane.

6. The support structure of claim 4 wherein the appendages consist of tube locking spring button clips that lock to keep them connected.

7. The support structure of claim 1 wherein the support structure comprises rigid tubular structures that are circular in cross-section and that are 0.5 inch to 1.5 inch in diameter and configured to support the weight of a person.

8. The support structure of claim 1 wherein the support structure is made from stainless steel or aluminum alloy.

9. The support structure of claim 1 wherein exterior surfaces of the support structure have smooth, matte, anodized, finishes to increase corrosion and wear resistance.

10. The support structure of claim 1 wherein the first and second grasping members are respectively connected at non-perpendicular angles to the first and second horizontally telescoping members and the first and second vertically telescoping members and in use extend upwardly away from the horizontal resting surface.

11. The support structure of claim 1 wherein the first and second grasping members are dimensioned and oriented to provide a succession of increasingly elevated handhold positions for the subject.

12. The support structure of claim 1 wherein the support structure is configured and dimensioned to be employed on a horizontal bed surface and further including at least one anchoring member structured, dimensioned and oriented to simultaneously be connected to the support structure and be disposed beneath a mattress of the bed, beneath a frame of the bed, or behind a headboard of the bed, in order to stabilize the support structure on the horizontal resting surface.

13. The support structure of claim 12 wherein the anchor member is composed of straps.

14. The support structure of claim 1 wherein the anchoring member is adjustable in size or length using straps and buckle apparatus to tighten and stabilize.

15. The support structure of claim 1 wherein the support structure is symmetrically dimensioned and configured in relation to the subject to provide equally distributed support for weight and movement of the subject.

16. The support structure of claim 1 wherein the support structure is portable, dismantlable, and removable from the horizontal resting surface.

17. The support structure of claim 1 in wherein the first and second grasping members have at least portions dimensioned and configured so an upwardly-facing human user supine on the horizontal resting surface can grip the first and second grasping members by at least partially encircling the first and second grasping members with their at least partially closed hands, the first and second grasping members being further configured and dimensioned to support the weight of the human user as the human user grips the first and second grasping members to progressively suspend and pull their upper body up and away from the horizontal resting surface and themself into an upright seated position between the first triangular substructure and the second triangular substructure.

18. The support structure of claim 1 wherein the first grasping member is hinged to the first distal end of the first horizontally telescoping member and the second distal end of the first vertically telescoping member, and the second grasping member is hinged to the third distal end of the second horizontally telescoping member and the fourth distal end of the second vertically telescoping member.

19. The support structure of claim 1 wherein the first and second horizontally telescoping members are configured to slide inwardly toward the first and second vertically telescoping members while simultaneously extending the first and second vertically telescoping members thereby altering acute complementary angles defined by the first and second triangular substructures.

20. The support structure of claim 19 wherein the first and second triangular substructures are configured to be individually collapsible thereby allowing the support structure to be exited from opposite sides of the bed.

21. The support structure of claim 1 wherein the first and second triangular substructures are configured to be collapsable, the first and second horizontally telescoping members being collapsable toward the back plane while the first and second vertically telescoping members further extend vertically, thereby angling the first and second grasping members to make room to allow the subject to exit the bed.

22. The support structure of claim 1 wherein the first and second grasping members are incased with foam or rubber gripping material.

* * * * *